(12) United States Patent
Movva et al.

(10) Patent No.: US 9,462,489 B2
(45) Date of Patent: Oct. 4, 2016

(54) USING CLIENT-SPECIFIC RGS TO IMPROVE PERFORMANCE ON MULTI-SIM AND MULTI-RAT DEVICES

(71) Applicant: QUALCOMM Incorporated, San Diego, CA (US)

(72) Inventors: Sasidhar Movva, Superior, CO (US); Mihir Pravin Nabar, Mumbai (IN); Chih-Ping Hsu, San Diego, CA (US); Sridhar Bandaru, Westminster, CO (US); Shriram Gurumoorthy, Superior, CO (US); Francis Ming-Meng Ngai, Louisville, CO (US); Christopher Barrett, Longmont, CO (US); Bhaskara Viswanadham Batchu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/330,291

(22) Filed: Jul. 14, 2014

(65) Prior Publication Data
US 2015/0334578 A1 Nov. 19, 2015

Related U.S. Application Data

(60) Provisional application No. 61/993,297, filed on May 15, 2014.

(51) Int. Cl.
*H04W 24/02* (2009.01)
*H04W 36/16* (2009.01)
(Continued)

(52) U.S. Cl.
CPC ........... *H04W 24/02* (2013.01); *H04W 36/165*
(2013.01); *H04W 36/245* (2013.01); *H04W 8/183* (2013.01); *H04W 88/06* (2013.01)

(58) Field of Classification Search
CPC . H04W 24/02; H04W 36/165; H04W 88/06; H04W 8/183
See application file for complete search history.

(56) References Cited

U.S. PATENT DOCUMENTS 7,508,888 B2 3/2009 Chan et al.
7,710,906 B2 5/2010 Kawada
(Continued)

FOREIGN PATENT DOCUMENTS

WO 0247281 A1 6/2002

OTHER PUBLICATIONS

International Search Report and Written Opinion—PCT/US2015/035638—ISA/EPO—Oct. 1, 2015.

*Primary Examiner* — Mohammad Anwar
(74) *Attorney, Agent, or Firm* — The Marbury Law Group, PLLC

(57) ABSTRACT

Various embodiments provide methods implemented in a mobile communication device (e.g., a multi-RAT communication device) for maintaining at least one separate RGS value for each of a plurality of RATs operating on the mobile communication device. Specifically, a device processor on the mobile communication device (e.g., a crystal oscillator manager) may maintain a separate, up-to-date RGS value for each of the plurality of RATs and may associate each of the plurality of RATs with their respective RGS values. By keeping track of the plurality of RATs' respective RGS values, the device processor may ensure that an appropriate RGS value is used to facilitate each RAT's individual operations, such as acquisition/re-acquisition operations, sleep scheduling calculations, and handover/inter-RAT measurement operations. As a result, various embodiments may improve the performance of each RAT and the overall performance of the mobile communication device.

30 Claims, 16 Drawing Sheets

(51) Int. Cl.
*H04W 36/24* (2009.01)
*H04W 88/06* (2009.01)
*H04W 8/18* (2009.01)

(56) References Cited

U.S. PATENT DOCUMENTS

| | | |
|---|---|---|
| 7,864,678 B1 | 1/2011 | Sampath et al. |
| 7,957,341 B2 | 6/2011 | Li et al. |
| 7,991,378 B2 | 8/2011 | Lindoff et al. |
| 2009/0316620 A1* | 12/2009 | Simic .................... H03J 1/0008 370/320 |
| 2010/0267410 A1* | 10/2010 | Chin .................. H04W 52/0216 455/515 |
| 2012/0140644 A1 | 6/2012 | Ngai et al. |
| 2013/0012212 A1* | 1/2013 | Murakami .......... H04W 36/245 455/439 |
| 2013/0188545 A1 | 7/2013 | Sankaranarayanan |
| 2013/0267259 A1* | 10/2013 | Shi ........................ G01S 19/03 455/456.6 |
| 2013/0329639 A1 | 12/2013 | Wietfeldt et al. |

* cited by examiner

| RAT | RGS Value |
|---|---|
| $RAT_1$ | $RGS_1$ |
| $RAT_2$ | $RGS_2$ |

FIG. 5A

| RGS Value | RATs | Subscriptions/SIMs | Base Station ID | Service Network ID | Temperature | Time | Location/GPS Coordinates |
|---|---|---|---|---|---|---|---|
| $RGS_1$ | $RAT_1$ | $Subscription_1$ | 123 | GSM | X° | A | Q° |
| $RGS_2$ | $RAT_2$ and $RAT_3$ | $Subscription_2$ | 456 | WCDMA | Y° | B | R° |
| $RGS_3$ | $RAT_2$ | $Subscription_2$ | 789 | WCDMA | Z° | C | S |

FIG. 5B

USING CLIENT-SPECIFIC RGS TO IMPROVE PERFORMANCE ON MULTI-SIM AND MULTI-RAT DEVICES

RELATED APPLICATIONS

This application claims the benefit of priority to U.S. Provisional Application No. 61/993,297 entitled "Using Client-Specific RGS To Improve Performance on Multi-SIM and Multi-RAT Devices" filed May 15, 2014, the entire contents of which are hereby incorporated by reference.

BACKGROUND

Some new designs of mobile communication devices—such as smart phones, tablet computers, and laptop computers—include two or more radio access technologies ("RATs") that enable the devices to connect to two or more radio access networks. Examples of radio access networks include LTE, GSM, TD-SCDMA, CDMA2000, and WCDMA. Such mobile communication devices (sometimes referred to as "multi-RAT communication devices") may also include one or more radio-frequency (RF) communication circuits or "RF resources" to provide users with access to separate networks via the two or more RATs.

Multi-RAT communication devices may include mobile communication devices (i.e., multi-Subscriber-Identity-Module (SIM), multi-active or "MSMA" communication devices) with a plurality of SIM cards that are each associated with a different RAT and utilize a different RF resource to connect to a separate mobile telephony network. Multi-RAT communication devices may also include multi-SIM-multi-standby or "MSMS" communication devices, which individually include two or more SIM cards/subscriptions that are each associated with a separate RAT, and the separate RATs share one or more RF chains to communicate with a plurality of separate mobile telephony networks on behalf of their respective subscriptions. Further, multi-RAT communication devices may include single-SIM communication devices, such as single-radio LTE ("SRLTE") or simultaneous GSM+LTE ("SGLTE") communication devices, which individually include one SIM card/subscription associated with two RATs that share a single shared RF resource to connect to two separate mobile networks on behalf of the one subscription.

Typically, a conventional multi-RAT communication device includes a crystal oscillator used, among other things, to provide a stable clock signal for digital integrated circuits and to stabilize frequencies for radio transmitters and receivers used by each RAT on the device to enable a RAT to communicate with a base station. When stabilizing frequencies, the multi-RAT communication device generally performs adjustments to the operational frequency of the crystal oscillator to account for the base station's natural deviations from its expected/standard frequency or timing (i.e., sometimes collectively referred to as the base station's "frequency error(s)"). For example, in response to determining the frequency error for a RAT's base station, the multi-RAT communication device may adjust its crystal oscillator's frequency to account for the determined frequency error of the base station, thereby enabling the RAT to acquire/maintain service with the base station using the corrected frequency.

Currently, RATs on a multi-RAT communication device may individually communicate with numerous different base stations. In conventional networks, timing mechanisms/clocks of base stations within the same network are usually synchronized to ensure consistent service for devices on that network, and as a result, these intra-network base stations usually have similar frequency errors. However, base stations associated with different networks or services providers typically do not have comparable frequency errors because separate networks usually are not synchronized with each other. Further, in some rare circumstances, it may also be possible that base stations within the same network have dissimilar frequency errors for various reasons, such as aging frequency generating components on some of the base stations.

Because a multi-RAT communication device must account for frequency errors of a variety of different base stations/networks to enable each of the multiple RATs to communicate with and/or receive service from their respective base stations, the potential differences in frequency errors between different base stations currently present a design and operational challenge for multi-RAT communication devices.

SUMMARY

Various embodiments provide methods, devices, and non-transitory processor-readable storage media for improving performance of a plurality of radio access technologies (RATs) on the mobile communication device. Embodiment methods may include obtaining Recent Good System (RGS) values for each of the plurality of RATs, associating the obtained RGS values with each of the plurality of RATs, and storing the obtained RGS values and the associations of the obtained RGS values.

Some embodiment methods may include associating the obtained RGS values with at least one attribute based on times at which the RGS values for the plurality of RATs are obtained. In some embodiments, an attribute may include one of a temperature of the mobile communication device, a temperature of a crystal oscillator on the mobile communication device, a base station identification, a subscription identification, a geographic location of the mobile communication device, a service network identification, and a timestamp.

Some embodiment methods may include identifying a RAT in the plurality of RATs associated with a request for an RGS value from a requesting entity, retrieving a stored RGS value associated with the identified RAT, and sending the retrieved RGS value to the requesting entity.

In some embodiments, retrieving a stored RGS value associated with the identified RAT may include identifying a first group of RGS values associated with the identified RAT, determining a confidence value for each RGS value in the first group of RGS values, and retrieving a stored RGS value in the first group of RGS values that has a highest confidence value in the first group of RGS values.

Some embodiment methods may include adjusting the retrieved RGS value based on a change in at least one stored attribute associated with the retrieved RGS value, in which sending the retrieved RGS value to the requesting entity may include sending the adjusted RGS value to the requesting entity.

In some embodiments, adjusting the retrieved RGS value based on a change in at least one stored attribute associated with the retrieved RGS value may include adjusting the retrieved RGS value based on a temperature change associated with the retrieved RGS value.

In some embodiments, retrieving a stored RGS value associated with the identified RAT may include identifying a first group of RGS values associated with the identified RAT, determining whether there is at least one stored RGS value in the first group of RGS values, and retrieving a substitute stored RGS value that is not associated with the identified RAT in response to determining that there are no RGS values in the first group of RGS values.

Some embodiment methods may include determining whether at least one RGS value in the first group of RGS values has a confidence value that satisfies a confidence threshold in response to determining that there is at least one RGS value in the first group of RGS values, retrieving a substitute stored RGS value that is not associated with the identified RAT in response to determining that no RGS value in the first group of RGS values associated with the identified RAT has a confidence value that satisfies the confidence threshold, and retrieving a stored RGS value in the first group of RGS values that has a highest confidence value in the first group of RGS values in response to determining that an RGS value in the first group of RGS values associated with the identified RAT has a confidence value that satisfies the confidence threshold.

In some embodiments, retrieving a substitute stored RGS value that is not associated with the identified RAT may include identifying a subscription associated with the identified RAT, identifying a second group of RGS values associated with the identified subscription, and determining a confidence value for each stored RGS value in the second group of RGS values.

Some embodiment methods may include determining whether there is a stored RGS value in the second group of RGS values that satisfies a confidence threshold and retrieving a stored RGS value in the second group of RGS values that has a highest confidence value within the second group of RGS values in response to determining that there is a stored RGS value in the second group of RGS values that satisfies the confidence threshold.

Some embodiment methods may include determining whether there is a stored RGS value available on the mobile communication device in response to determining that there is no stored RGS value in the second group of RGS values associated with the identified subscription that satisfies the confidence threshold, retrieving a stored RGS value available on the mobile communication device that has a highest confidence value in response to determining that there is a stored RGS value available on the mobile communication device, and generating an RGS value approximation using a mathematical model in response to determining that there is no stored RGS value available on the mobile communication device.

Some embodiment methods may include determining an updated RGS value for a RAT of the plurality of RATs based on current network conditions of the RAT, associating the updated RGS value with the RAT, and storing the updated RGS value and the association of the updated RGS value with the RAT.

Some embodiment methods may include associating the updated RGS value with at least one current attribute based on a time at which the updated RGS value is determined, in which storing the updated RGS value and the association of the updated RGS value with the RAT may include storing the updated RGS value and the association of the updated RGS value with the RAT and with the at least one current attribute.

Some embodiment methods may include determining an updated RGS value for a RAT of the plurality of RATs based on current network conditions of the RAT, retrieving a stored RGS value associated with the RAT, and modifying the stored RGS value associated with the RAT based on the updated RGS value.

Some embodiment methods may include identifying at least one attribute associated with the updated RGS value based on a time at which the updated RGS value is determined and modifying at least one attribute associated with the modified RGS value based on the at least one identified attribute associated with the updated RGS value.

Some embodiment methods may include retrieving an RGS value associated with a RAT in the plurality of RATs in response to receiving a sleep notification from the RAT, determining a period of time based on the sleep notification and the retrieved RGS value, and configuring the RAT to wake up at an expiration of the period of time.

Some embodiment methods may include adjusting the retrieved RGS value based on a change in at least one stored attribute associated with the retrieved RGS value, in which determining a period of time based on the sleep notification and the retrieved RGS value may include determining the period of time based on the sleep notification and the adjusted RGS value.

Some embodiment methods may include determining that a RAT in the plurality of RATs is about to perform one of network acquisition operations and network re-acquisition operations, retrieving an RGS value associated with the RAT, and configuring the RAT to perform the one of the network acquisition operations and the network re-acquisition operations based on the retrieved RGS value.

Some embodiment methods may include adjusting the retrieved RGS value based on a change in at least one stored attribute associated with the retrieved RGS value, in which configuring the RAT to perform the one of the network acquisition operations and the network re-acquisition operations based on the retrieved RGS value may include configuring the RAT to perform the one of the network acquisition operations and the network re-acquisition operations based on the adjusted RGS value.

Some embodiment methods may include retrieving an RGS value associated with a base station in response to determining that a RAT in the plurality of RATs is about to perform a handover operation to the base station and configuring the RAT to perform the handover operation to the base station based on the retrieved RGS value.

Some embodiment methods may include adjusting the retrieved RGS value based on a change in at least one stored attribute associated with the retrieved RGS value, in which configuring the RAT to perform the handover operation to the base station based on the retrieved RGS value may include configuring the RAT to perform the handover operation to the base station based on the adjusted RGS value.

Some embodiment methods may include retrieving an RGS value associated with a second RAT in the plurality of RATs in response to determining that a first RAT in the plurality of RATs is about to perform an inter-RAT measurement of the second RAT and configuring the first RAT to perform the inter-RAT measurement of the second RAT based on the retrieved RGS value.

Some embodiment methods may include adjusting the retrieved RGS value based on a change in at least one stored attribute associated with the retrieved RGS value, in which configuring the first RAT to perform the inter-RAT measurement of the second RAT based on the retrieved RGS value may include configuring the first RAT to perform the inter-RAT measurement of the second RAT based on the adjusted RGS value.

Various embodiments may include a mobile communication device configured with processor-executable instructions to perform operations of the methods described above.

Various embodiments may include a mobile communication device having means for performing functions of the operations of the methods described above.

Various embodiments may include non-transitory processor-readable media on which are stored processor-executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 5A and 5B are data tables illustrating RGS values associations for use with various embodiments.

DETAILED DESCRIPTION

Figure 1:
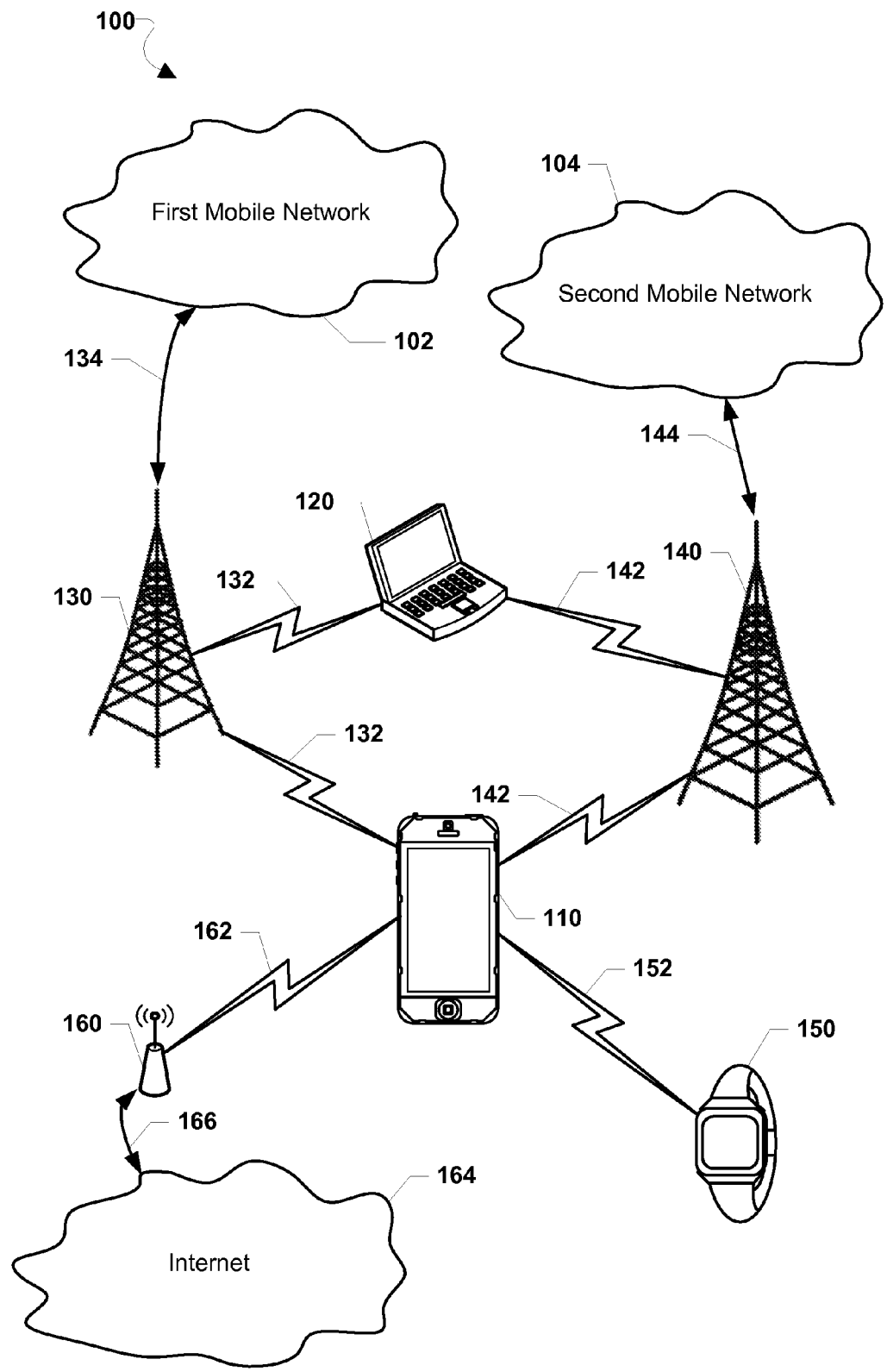
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "wireless device," "mobile communication device," and "multi-RAT communication device" are used interchangeably and refer to any one or all of cellular telephones, smart phones, personal or mobile multimedia players, personal data assistants, laptop computers, personal computers, tablet computers, smart books, palm-top computers, wireless electronic mail receivers, multimedia Internet enabled cellular telephones, wireless gaming controllers, and similar personal electronic devices that include a programmable processor, memory, and circuitry for connecting to at least two mobile communication networks. Various embodiments may be useful in mobile communication devices, such as smart phones, and so such devices are referred to in the descriptions of various embodiments. However, various embodiments may be useful in any electronic devices that may individually maintain a plurality of RATs associated with one or more subscriptions/SIMs and that utilize one or more RF resources.

Conventional mobile communication devices include a crystal oscillator manager (e.g., a processor or controller) that obtains a base station's current frequency error value (e.g., from a RAT on the device). This frequency error value is sometimes referred to as an "RGS value," which stands for a "Recent Good System" value, and the crystal oscillator manager typically utilizes the RGS value to enable a RAT to perform network acquisition operations and/or network re-acquisition operations by stabilizing frequencies and/or by adjusting the frequency of communications exchanged with the RAT's base station. The crystal oscillator manager also uses the RGS value to program the RAT's sleep cycle by converting the RGS value from the frequency domain into a time domain value used to determine a period of time for which the RAT may perform sleep/idle mode operations. For example, to ensure that the RAT sleeps for an expected or desired amount of time, the crystal oscillator manager may adjust the current frequency value of the crystal oscillator using the RGS value to determine the appropriate amount of time to permit the RAT to sleep.

In a conventional multi-RAT communication device, the crystal oscillator manager only maintains one RGS value (sometimes referred to as a "system RGS value") to service all RATs operating on the multi-RAT communication device. In current practice, the crystal oscillator manager periodically receives updated RGS values from the plurality of RATs and only retains the latest RGS value received from any one of the plurality of RATs. For example, the crystal oscillator manager may replace a first system RGS value received from a first RAT with a second system RGS value received from a second RAT, only to replace the second system RGS value with a third system RGS value received at a later time from a third RAT. Due to the potential differences in frequency errors between different networks (or even between individual base station in the same network), the use of only one system RGS value often results in errors in sleep duration calculations and problems performing acquisition/re-acquisition for many of the plurality of RATs. Further, in many scenarios, individual pilot timing/slew errors during slotted mode have been observed in mobile devices using only one system RGS value to service a plurality of RATs.

In overview, various embodiments provide methods implemented in a mobile communication device (e.g., a multi-RAT communication device) for maintaining at least one separate RGS value for each of a plurality of RATs operating on the mobile communication device. Specifically, a device processor on the mobile communication device (e.g., a crystal oscillator manager) may maintain a separate, up-to-date RGS value for each of the plurality of RATs and may associate each of the plurality of RATs with their respective RGS values. By keeping track of the plurality of RATs' respective RGS values, the device processor may ensure that an appropriate RGS value is used to facilitate each RAT's individual operations, such as acquisition/re-acquisition operations, sleep scheduling calculations, and handover/inter-RAT measurement operations. As a result, various embodiments may improve the performance of each RAT and the overall performance of the mobile communication device.

In various embodiments, the mobile communication device may include a crystal oscillator for use with stabilizing frequencies and performing timing calculations as described, and the characteristics of the crystal's oscillation frequency may change based on temperature. For example, the crystal's oscillation frequency may be slower when exposed to relatively colder temperatures and faster when exposed to relatively warmer temperatures. In some embodiments, the device processor operating on the mobile communication device may adjust an RGS value based on the effects of temperature on the crystal oscillator's operating frequency. In the above example, the device processor may increase the RGS value to compensate for colder temperatures or may decrease the RGS value to compensate for warmer temperatures. In some embodiments, the crystal oscillator may be a "temperature-compensated" crystal oscillator, meaning that the oscillator is designed to minimize the effects of temperature on the oscillation frequency of the crystal. In other embodiments, the crystal oscillator may be a "non-temperature-compensated" crystal oscillator, and the device processor may perform various operations of the embodiment methods to compensate for the relatively larger effects of temperature on the crystal oscillator's operating frequency.

In some embodiments, the mobile communication device processor may maintain a record of a change in temperature that may affect the performance of the crystal oscillator for each of the plurality of RATs and may adjust each RAT's specific RGS value based on a temperature change specific to that RAT's RGS value. Specifically, the mobile communication device processor may associate a temperature of the mobile communication device with an RGS value at the time at which a RAT reports the RGS value to the device processor. Thus, at a later time, the mobile communication device processor may adjust the RGS value by comparing the stored temperature value associated with the RGS value with the current temperature of the mobile communication device and adjusting the RGS value based on the difference between the temperatures. While useful in a variety of mobile communication devices, such embodiments may be especially useful in mobile communication devices that include non-temperature-compensated crystal oscillators as the relatively higher variation of operational frequency in these crystal oscillators may be effectively accounted for by maintaining a record of temperature changes that may affect RGS values associated with specific RATs.

A stored RGS value may reflect a particular combination of factors and conditions experienced/observed on the mobile communication device at an initial time at which the RGS value is received on the mobile communication device. Examples of factors and conditions that may be experienced/observed on the mobile communication device include the device/crystal oscillator temperature (as described), geographic location, time (e.g., a timestamp), subscription, etc. associated with the RGS value at the time the RGS value is received/obtained. Thus, a stored RGS value may be the most useful in situations in which the current conditions of the mobile communication device are similar to the conditions that existed at the time the RGS value was initially received/obtained.

In some embodiments, the mobile communication device processor may keep a record of the conditions/circumstances surrounding an RGS value by storing and maintaining at least one "attribute" for each RGS value stored on the mobile communication device. In such embodiments, an attribute of an RGS value may describe an aspect of the conditions/circumstances at the time at which the RGS value was initially obtained/received on the mobile communication device. Specifically, attributes associated with an RGS value may include one or more of the following: a RAT or RATs associated with the RGS value; a subscription associated with the RAT/RATs, a temperature of the mobile communication device; a temperature of the crystal oscillator, a service network (e.g., GSM, WCDMA); a geographic location/GPS coordinates of the mobile communication device; and the time at which the RGS values are obtained, such as in the form of a timestamp. In such embodiments, the mobile communication device processor may use these attributes to differentiate RGS values in order to select/use a stored RGS value that is most suitable for the current conditions/circumstances of the mobile communication device. For example, the mobile communication device processor may determine the current geographic location of the mobile device and may retrieve a stored RGS value associated with the current geographic location.

In some embodiments, the mobile communication device processor may store and maintain each RGS value and associations/attributes of the RGS values in memory. The RGS values may be stored and maintained in a look-up table, a database, an associated list, and/or any other known data structure or storage mechanism.

In some embodiments, the mobile communication device processor may respond to requests for an RGS value from a requesting entity (e.g., a RAT, a sleep controller, a GPS module/receiver, etc.) by identifying a RAT associated with the request and sending the requesting entity an RGS value associated with the RAT associated with the request. For example, a first RAT may request an RGS value to enable the first RAT to perform re-acquisition activities after exiting a sleep mode, and the mobile communication device processor may identify that the first RAT is associated with the request and may return an RGS value to the first RAT that is associated with the first RAT.

As described, an RGS value may be best suited for use in situations in which the current conditions/circumstances of the mobile communication device are similar to the conditions/circumstances that occurred when the RGS value was received/obtained on the mobile communication device. In other words, the RGS value may be very useful (i.e., reliable) when the attributes associated with the RGS value line up with the current conditions of the mobile communication device. In view of this, in some embodiments, the mobile communication device processor may retrieve a stored RGS value for a requesting entity based on a "confidence value" of the RGS value, which may be a measure of the predicted reliability or accuracy of the RGS value. For example, a RAT using an RGS value with a high-confidence value may acquire service faster than when using an RGS value with a low-confidence value because the high-confidence value may be more accurate or reliable, thereby requiring an overall shorter search window for acquiring service.

In some embodiments, the confidence value of the RGS value may be based on a comparison between the attributes associated with the stored RGS value and the current conditions/circumstances of the mobile communication device. For example, a low confidence value for a stored RGS value may indicate that the stored RGS value is associated with (i.e., suitable for use in) conditions/attributes that differ greatly from the conditions currently experienced/observed on the mobile communication device. In another example, a stored RGS value may have a high confidence value when its attributes are similar to current situations.

Thus, in some embodiments, in response to receiving a request for an RGS value for a first RAT from a requesting entity, the mobile communication device processor may initially attempt to retrieve a stored RGS value associated with the first RAT such that the stored RGS value has a sufficiently high confidence value. In such embodiments, the mobile communication device processor may determine whether there is a stored RGS value associated with the first RAT that satisfies (e.g., is greater than or equal to) a minimum confidence threshold and may retrieve a stored RGS value with a confidence that satisfies the confidence threshold. In response to determining that no stored RGS value associated with the RAT satisfies the confidence threshold, the mobile communication device processor may attempt to retrieve a stored RGS value that satisfies the confidence threshold from a group of RGS values associated with the first RAT's subscription (e.g., associated with a second RAT associated with the same subscription) and, failing that, any other stored RGS value that satisfies the confidence threshold. In the event that there are no stored RGS values available, the mobile communication device processor may generate an RGS value approximation using a mathematical model (see FIG. 7C).

In some embodiments, a mobile communication device processor may monitor for changes in a RAT's network conditions related to frequency errors. In response to detecting a change in frequency errors (e.g., after the RAT's reselection to another base station), the mobile communication device processor may determine an updated RGS value for the RAT based on the RAT's current network conditions and may associate the updated RGS value with that RAT. In some embodiments, the mobile communication device processor may also associate at least one attribute of the current condition/circumstances of the mobile communication device with the updated RGS value. For example, a current temperature of the crystal oscillator may be associated with the updated RGS value to ensure that future temperature corrections/compensations for the updated RGS value are accurate.

In some embodiments, the mobile communication device processor may modify a previously stored RGS value based on the updated RGS value. In other words, rather than overwriting a previously stored RGS value with a potentially spurious updated RGS value, the mobile communication device processor may adjust a previously stored RGS value (e.g., by averaging the two RGS values) to prevent drastic changes in the RGS value that may negatively impact performance on the mobile communication device.

In some embodiments, a mobile communication device processor on the mobile communication device (e.g., a sleep controller) may determine a period of time to allow a RAT to remain in a sleep/idle mode based on an RGS value associated with that RAT. As a result, the mobile communication device processor may ensure that the calculated sleep duration of the RAT is accurate (i.e., not too long or too short). In some embodiments, the mobile communication device processor may adjust/compensate the RGS value based on a change in at least one stored attribute associated with the RGS value, such as by adjusting the RGS value based on a temperature change associated with the RGS value to avoid timing errors caused by the change in the operating frequency of the mobile communication device's crystal oscillator.

In some embodiments, a mobile communication device processor on the mobile communication device may obtain an RGS value associated with a RAT and may provide that RGS value to the RAT to enable the RAT to perform network acquisition or re-acquisition operations using that RGS value. In some embodiments, the mobile communication device processor may adjust/compensate the RGS value based on a change in at least one stored attribute associated with the RGS value. For example, the mobile communication device processor may adjust the RGS value based on a temperature change associated with the RGS value to provide the RAT with the correct frequencies to enable the RAT to establish or reestablish service with a base station.

In some embodiments, in response to determining that a RAT is or is about to perform handoff operations to a base station, a mobile communication device processor on the mobile communication device may obtain an RGS value associated with the base station and may provide that RGS value to the RAT to enable the RAT to perform handoff operations using that RGS value.

In some embodiments, in response to determining that a first RAT is or is about to perform inter-RAT measurements of a second RAT, a mobile communication device processor may obtain an RGS value associated with the second RAT being measured and may provide that RGS value to the first RAT to enable the first RAT to perform inter-RAT measurements using that RGS value.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the mobile communication devices 110, 120 are shown connected to two mobile networks 102, 104, in some embodiments (not shown), the mobile communication devices 110, 120 may include two or more subscriptions to two or more mobile networks and may connect to those subscriptions in a manner similar to those described above.

In some embodiments, the first mobile communication device 110 may establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

In some embodiments, each of the mobile communication devices 110, 120 may communicate with the first and second base stations 130, 140 using a different RAT. For example, the first mobile communication device 110 may have a first RAT (e.g., a CDMA RAT) for communicating with the first mobile network 102 (e.g., a CDMA network) via the first base station 130 and may have a second RAT (e.g., a GSM RAT) for communicating with the second mobile network 104 (e.g., a GSM mobile network) via the second base station 140. In some embodiments, the RATs on the mobile communication device 110, 120 may operate on behalf of the same subscription (e.g., in a SRLTE communication device) or on behalf of different subscriptions (e.g., in a DSDS or DSDA communication device).

Figure 2:
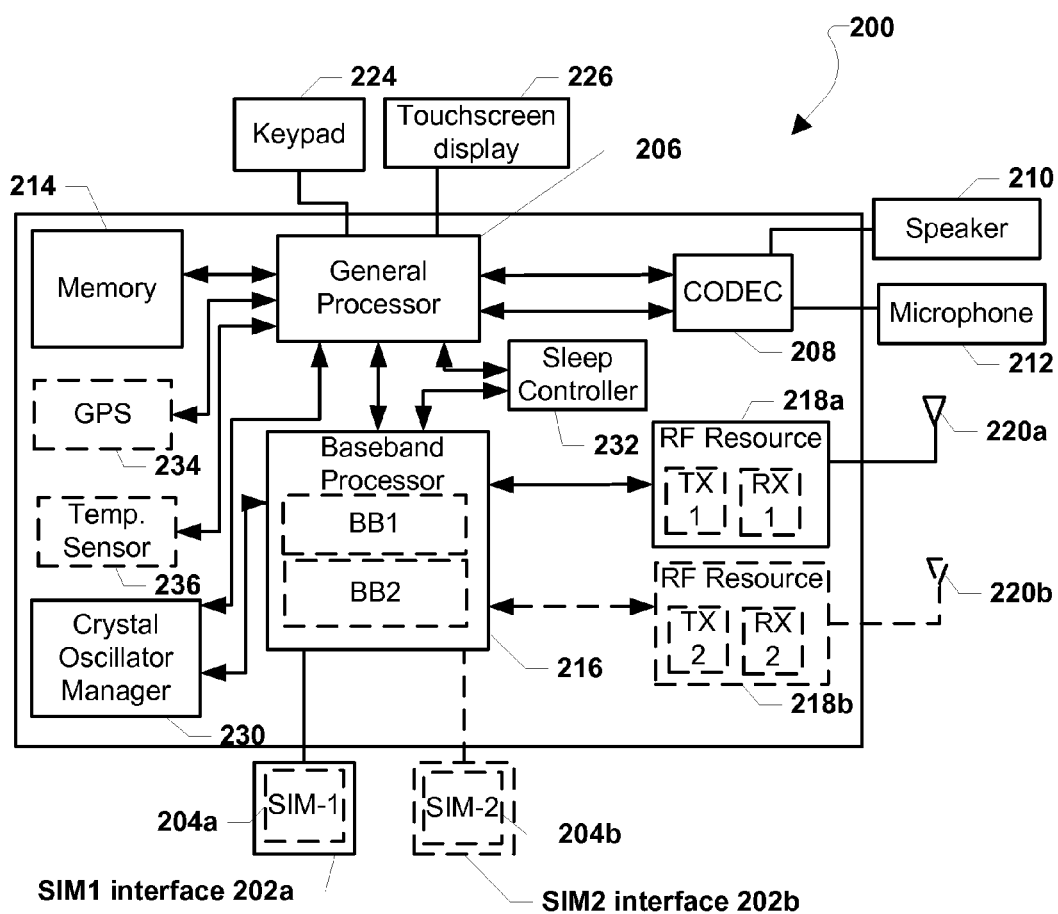
FIG. 2 is a component block diagram of a mobile communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1-2, the mobile communication device 200 may include a first SIM interface 202a, which may receive a first identity module SIM-1 204a that is associated with a first subscription. The mobile communication device 200 may optionally also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the mobile communication device, and thus need not be a separate or removable circuit, chip or card.

A SIM used in various embodiments may contain user account information, an international mobile subscriber identity (IMSI), a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification.

The mobile communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure. In some embodiments, the memory 214 may also store one or more look-up tables (e.g., as described with reference to FIGS. 5A-5B) that include RGS values associated with each of a plurality of RATs operating on the mobile communication device 200, as well other information, such as the subscription, base station, network/service provider, geographic location, temperatures, times/timestamps, and/or other information associated with each RAT's RGS value. For example, a look-up table stored in the memory 214 may include information useful in determining a specific RGS value to use for a RAT currently operating on behalf of a particular subscription and/or communicating with a particular base station.

The general purpose processor 206 and the memory 214 may each be coupled to at least one baseband modem processor 216. Each SIM and/or RAT in the mobile communication device 200 (e.g., SIM-1 204a and SIM-2 204b) may be associated with a baseband-RF resource chain. The baseband-RF resource chain may include the baseband modem processor 216, which may perform baseband/modem functions for communicating with/controlling a RAT, and may include one or more amplifiers and radios, referred to generally herein as RF resources (e.g., the RF resource 218a and, optionally, RF resource 218b). In some embodiments, baseband-RF resource chains may share the baseband modem processor 216 (i.e., a single device that performs baseband/modem functions for all RATs on the wireless device). In other embodiments, each baseband-RF resource chain may include physically or logically separate baseband processors (e.g., BB1, BB2).

The RF resources 218a, 218b may each be transceivers associated with one or more RATs and may perform transmit/receive functions for the wireless device on behalf of their respective RATs. For example, a first RAT (e.g., a GSM RAT) may be associated with the RF resource 218a, and a second RAT (e.g., a CDMA or WCDMA RAT) may be associated with the RF resource 218b. In another example, the first RAT and the second RAT may both be associated with the RF resource 218a. The RF resources 218a, 218b may include separate transmit and receive circuitry, or may include a transceiver that combines transmitter and receiver functions. The RF resources 218a, 218b may each be coupled to a wireless antenna (e.g., a first wireless antenna 220a or an optional second wireless antenna 220b). The RF resources 218a, 218b may also be coupled to the baseband modem processor 216.

In some embodiments, the general purpose processor 206, the memory 214, the baseband processor(s) 216, and the RF resources 218a, 218b may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband processor BB1, BB2, the RF resources 218a, 218b, and the wireless antennas 220a, 220b may constitute two or more RATs. For example, a SIM, baseband processor, and RF resource may be configured to support two different RATs. More RATs may be supported on the mobile communication device 200 by adding more SIM cards, SIM interfaces, RF resources, and/or antennae for connecting to additional mobile networks.

The mobile communication device 200 may include a crystal oscillator manager 230 configured to manage RGS values associated with each of the plurality of RATs on the mobile communication device 200, such as by storing the RGS values in look-up tables in the memory 214, as described. The crystal oscillator manager 230 may be implemented as a software module implemented on the general purpose processor 206 or the baseband modem processor 216, as a separate hardware component, or as a combination of hardware and software. The crystal oscillator manager 230 may interact with other components on the mobile communication device 200, such as a sleep controller 232, to enable each of the plurality of RATs to perform various operations, such as sleep operations, acquisition and re-acquisition operations, handover operations, and/or inter-RAT measurements as described (e.g., with reference to FIGS. 4-12). For example, the crystal oscillator manager 230 may receive temperature measurements of the mobile communication device 200 (and/or temperature measurements of the crystal oscillator (not shown)) from a temperature sensor 236, and the crystal oscillator manager 230 may use those temperature measurements to adjust one or more RGS values.

In some embodiments, the sleep controller 232 may be configured to determine a period of time during which a RAT may perform sleep and/or idle-mode operations in response to receiving a sleep notification from that RAT. Specifically, the sleep controller 232 may obtain an RGS value associated with a notifying RAT and may calculate the sleep program/sleep duration for that RAT based on the retrieved RGS value.

In some embodiments, the sleep controller 232 may convert the RGS value into the time domain and/or may adjust the RGS value in response to temperature changes on the mobile communication device 200 that may have occurred since when the RGS value was initially stored. The sleep controller 232 may be implemented as a software module implemented on the general purpose processor 206 or the baseband modem processor 216 or the crystal oscillator manager 230, as a separate hardware component, or as a combination of hardware and software.

In some embodiments, the mobile communication device 200 may include a global positioning system (GPS) module 234 (e.g., a GPS receiver) configured to provide location information to the general purpose processor 206. As described, location information, such as provided by a GPS module 234, may be used by the general purpose processor 206 to select an RGS value stored in memory and/or to determine when a stored RGS value is not reliable. In such embodiments, the GPS module 234 may obtain RGS values for the global positioning system that are associated with the GPS module 234.

Figure 3:
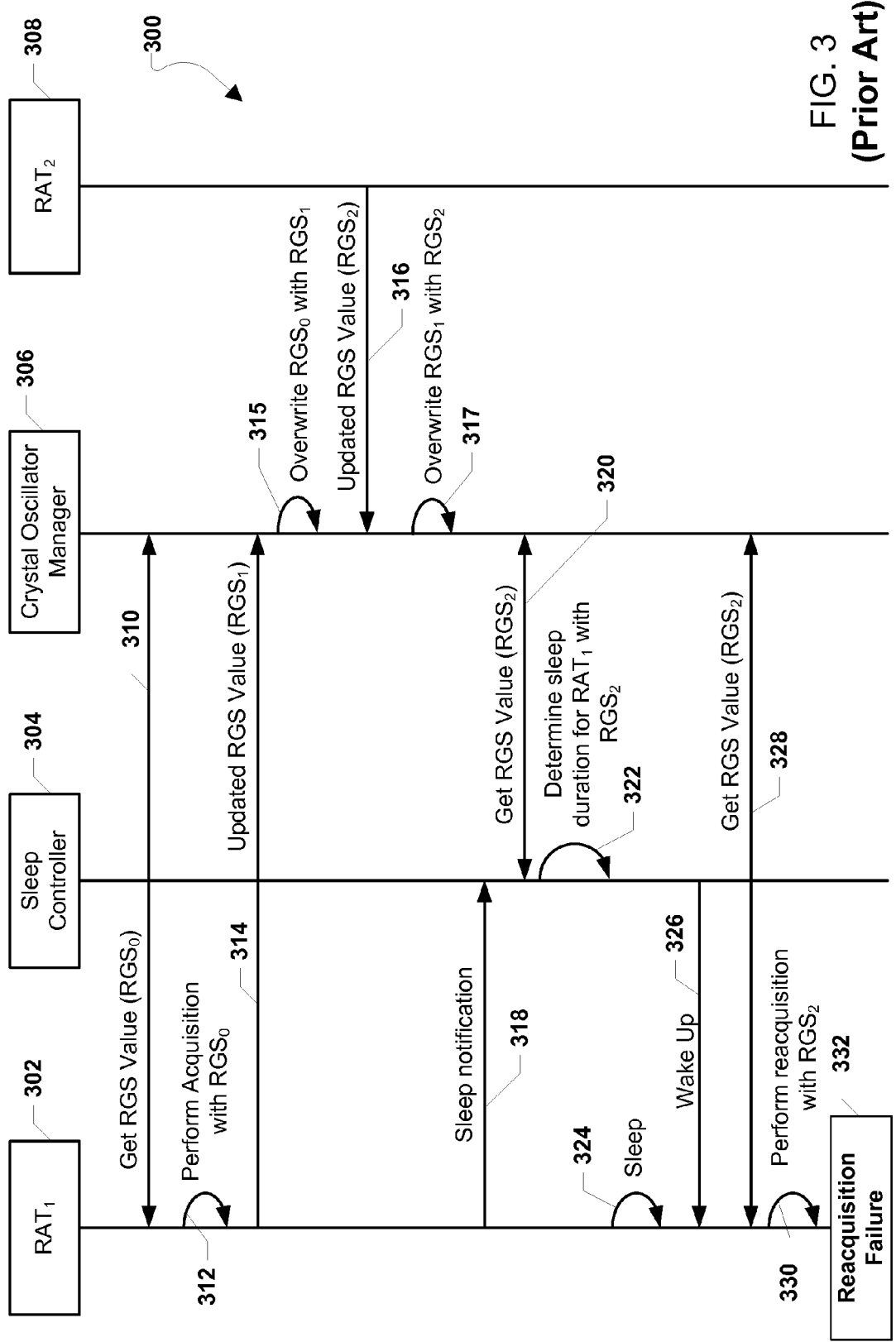
FIG. 3 is a signaling and call flow diagram illustrating conventional RGS value acquisition and update by components of a mobile communication device.

FIG. 3 is a signaling and call flow diagram 300 illustrating example communications between various components on a conventional mobile communication device in which the various components rely on only one system RGS value to enable a plurality of RATs to perform sleep, acquisition, and/or re-acquisition operations. With reference to FIGS. 1-3, the conventional communication device includes a first RAT 302 (labeled in FIG. 3 as "$RAT_1$"), a second RAT 308 (labeled in FIG. 3 as "$RAT_2$"), a sleep controller 304 (e.g., the sleep controller 232 of FIG. 2), and a crystal oscillator manager 306 (e.g., the crystal oscillator manager 230 of FIG. 2).

In the example illustrated in FIG. 3, the first RAT 302 must acquire an RGS value in order to perform network acquisition as the first RAT 302 must use the RGS value to determine the actual frequency of a nearby base station for purposes of acquiring service from that base station. Thus, after powering up (not shown), the first RAT 302 sends a request to and receives an RGS value (i.e., an $RGS_0$ value) from the crystal oscillator manager 306, via signaling 310.

In conventional mobile communication devices, the crystal oscillator manager 306 stores only one RGS value (i.e., the system RGS value), such as the latest or most up-to-date RGS value received from any of the plurality of RATs operating on the mobile communication device. Thus, in response to receiving a request for an RGS value from the first RAT 302, the crystal oscillator manager sends the system RGS value to the first RAT 302.

On acquiring the $RGS_0$ value from the crystal oscillator manager 306, the first RAT 302 performs acquisition operations 312 with the $RGS_0$ value. In the example illustrated in the diagram 300, the $RGS_0$ value may be associated with the first RAT 302, thereby enabling the first RAT 302 to successfully perform acquisition operations 312.

During the course of its communications with its base station (not shown), the first RAT 302 determines an updated RGS value and/or receives an updated RGS value from its base station (i.e., an $RGS_1$ value). The first RAT 302 reports the $RGS_1$ value to the crystal oscillator manager 306 via signaling 314, and in response, the crystal oscillator manager 306 overwrites the $RGS_0$ value with the $RGS_1$ value in operation 315.

At some later time, the crystal oscillator manager 306 receives another updated RGS value (i.e., an $RGS_2$ value) from the second RAT 308 via signaling 316. The $RGS_2$ value may be specific to the second RAT 308's base station (i.e., that base station's particular frequency errors), and thus may only be suitable for use with the second RAT 308 and not with any other RAT on the conventional mobile communication device (e.g., the first RAT 302). However, according to conventional implementations, the crystal oscillator manager 306 only keeps the latest RGS value and thus overwrites the $RGS_1$ value received from the first RAT 302 with the $RGS_2$ value received from the second RAT 308, in operation 317.

Occasionally, the plurality of RATs on the mobile communication device may need to enter a sleep/idle mode, for example, to conserve power when those RATs are not performing receive or transmit operations. In anticipation of entering a sleep/idle mode, a RAT may notify a sleep controller.

For instance, in the example illustrated in the diagram 300, the first RAT 302 sends a sleep notification to the sleep controller 304, via signaling 318, shortly before entering a sleep or idle mode in operation 324. In response to receiving the sleep notification, the sleep controller 304 sends a request for an RGS value to and receives the stored system RGS value (i.e., the $RGS_2$ value) from the crystal oscillator manager 306, via signaling 320.

In operation 322, the sleep controller 304 determines a period of time that the first RAT 302 should remain asleep/idle before being reactivated (i.e., a sleep duration) using the $RGS_2$ value. The sleep controller 304 may accomplish this operation by converting the frequency information in the $RGS_2$ value into time-domain/timing information that may be used to determine how long the first RAT 302 should remain asleep before the first RAT 302 must reacquire service from its base station. Thus, after the first RAT 302 enters a sleep mode in operation 324, the sleep controller 304 sends a wake up signal 326 to the first RAT 302 at the end of the sleep duration as calculated in operation 322.

Because the sleep duration calculated in operation 322 is based on the $RGS_2$ value received from the second RAT 308 and is not based on an RGS value associated with the first RAT 302 (e.g., the $RGS_1$ value), the sleep duration may be incorrect for the first RAT. In other words, the sleep duration may not accurately reflect the timing and/or frequency information for the first RAT 302's network and/or base station because the $RGS_2$ value indicates frequency error information for the second RAT 308's base station/network. As a result, the sleep controller 304 may send the wake up signal 326 to the first RAT 302 at a time other than a desired or expected wakeup time for the first RAT 302, potentially causing the first RAT 302 to experience pilot timing errors or slew errors.

Further, in order to perform reacquisition operations, the first RAT 302 requests and receives the $RGS_2$ value from the crystal oscillator manager 306, via signaling 328. As described, the $RGS_2$ value may only be useful to operations related to the second RAT 308 because the $RGS_2$ value reflects the frequency errors of the second RAT 308's base station, and not a base station associated with the first RAT 302. Thus, when the first RAT 302 attempts to perform reacquisition operations 330 with the $RGS_2$ value, the first RAT 302 may fail to reacquire service (i.e., block 332).

As seen in the example illustrated in the diagram 300, conventional methods of storing only one system RGS value to support the sleep, acquisition, and re-acquisition operations of a plurality of RATs operating on the mobile communication device may cause substantial problems with sleep timing and acquisition/re-acquisition operations when the system RGS value is received from one RAT (e.g., the second RAT 308) and used by or on behalf of another RAT (e.g., the first RAT 302). As a result, the overall performance of the mobile communication device may suffer.

The various embodiments address the limitations of conventional mobile communication devices—such as those described with reference to FIG. 3—by configuring the crystal oscillator manager to store separate RGS values for each of a plurality of RATs on the mobile communication device.

Figure 4:
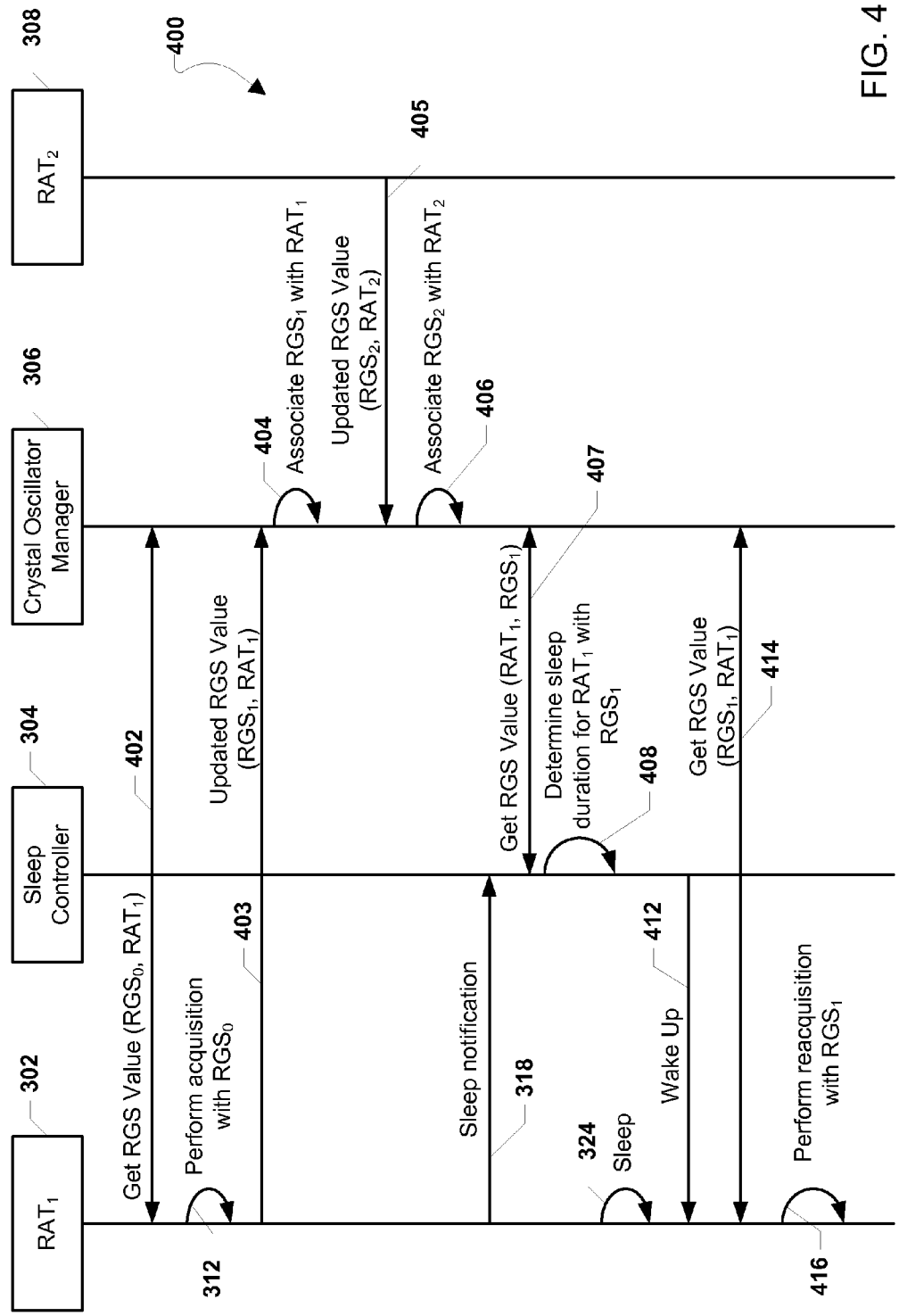
FIG. 4 is a signaling and call flow diagram illustrating RGS value acquisition and update by components of a mobile communication device according to various embodiments.

FIG. 4 is a signaling and call flow diagram 400 illustrating communications between various components on a mobile communication device (e.g., the mobile communication device 200 of FIG. 2) according to various embodiments. With reference to FIGS. 1-4, mobile communication device may include the first RAT 302, the sleep controller 304, the crystal oscillator manager 306, and the second RAT 308.

In the illustrated example, the crystal oscillator manager 306 may have previously stored an RGS value (i.e., the $RGS_0$ value) that is associated with the first RAT 302, meaning that the first RAT 302 may have previously reported the $RGS_0$ value to the crystal oscillator manager 306 as indicating the frequency errors of the first RAT 302's base station/network.

After powering up or reactivating (not shown), the first RAT 302 may need to acquire an up-to-date RGS value from the crystal oscillator manager 306 in order to determine the actual frequencies needed to communicate with a nearby base station associated with or recently used by the first RAT 302. Thus, the first RAT 302 may send a request for an up-to-date RGS value to the crystal oscillator manager 306, via signaling 402. In some embodiments, the request may include information that may enable the crystal oscillator manager 306 to identify the requesting RAT.

In response to receiving the request from the first RAT 302, the crystal oscillator manager 306 may identify the first RAT 302 as being associated with the request and may return an RGS value associated with the first RAT (i.e., the $RGS_0$ value), via the signaling 402. In some embodiments, the crystal oscillator manager 306 may obtain the $RGS_0$ value from a data table stored in memory (e.g., the memory 214) by performing a look-operation in the data table (e.g., as described with reference to FIGS. 5A-5B) based on at least the first RAT 302's identity to find a RGS value associated with the first RAT 302.

In response to receiving the $RGS_0$ value, the first RAT 302 may perform acquisition operations 312 with the $RGS_0$ value, as described. Because the $RGS_0$ value is associated with the first RAT 302, the first RAT 302 may successfully perform the acquisition operations 312 as the first RAT 302 may use the $RGS_0$ value to determine the frequencies needed to communicate with a nearby base station.

At some later time, the first RAT 302 (or another component on the mobile communication device) may obtain an updated RGS value (i.e., the $RGS_1$ value), either by receiving the $RGS_1$ value directly from the first RAT 302's base station/network or by determining the frequency errors of the first RAT 302's current base station. For example, the first RAT 302 may compare the frequency of communications received from its base station with the base station's expected frequency and may determine the $RGS_1$ value based on the difference. In some embodiments, the $RGS_1$ value may reflect the current operational frequency of the crystal oscillator based on the current temperature of the mobile communication device.

The first RAT 302 may send the updated RGS value (i.e., the $RGS_1$ value) to the crystal oscillator manager 306 via signaling 403, as well as information identifying the first RAT 302. In response, the crystal oscillator manager 306 may associate the $RGS_1$ value with the first RAT 302 in operation 404, for instance, by updating the current RGS value associated with the first RAT 302 (i.e., the $RGS_0$ value) in a look-up table.

In some embodiments, the first RAT 302 may send additional information to the crystal oscillator manager 306—via signaling 403—that further describes the updated RGS value or the context in which the updated RGS value was obtained (i.e., one or more "attributes" related to the updated RGS value). In such embodiments, the crystal oscillator manager 306 may associate this additional information with the updated RGS value (e.g., as described with reference to FIG. 5B). For example, the first RAT 302 may send information indicating that the $RGS_1$ value is related to a second subscription and/or base station with a particular ID number because the first RAT 302 was communicating with that particular base station on behalf of the second subscription at the time the first RAT 302 acquired the $RGS_1$ value.

As described with reference to the first RAT 302, the second RAT 308 may also obtain an updated RGS value (i.e., the $RGS_2$ value) and may report the $RGS_2$ value to the crystal oscillator manager 306 via signaling 405. In response, the crystal oscillator manager 306 may associate the $RGS_2$ value with the second RAT 308 in operation 406, such as by updating the RGS value associated with the second RAT 308 in a look-up table as described with reference to operation 404.

In the illustrated example, the first RAT 302 may send a sleep notification 318 to the sleep controller 304 (e.g., as described with reference to FIG. 3) before initiating sleep/idle-mode operations in operation 324. In response to receiving the sleep notification 318, the sleep controller 304 may obtain an RGS value associated with the first RAT 302 from the crystal oscillator manager 306, via signaling 407. For example, the sleep controller 304 may send a request for the current RGS value associated with the first RAT 302 (i.e., the $RGS_1$ value) to the crystal oscillator manager 306. In this example, the crystal oscillator manager 306 may obtain the $RGS_1$ value for the first RAT 302 by performing a look-up operation based on the first RAT 302's identity in a data table of RGS values, and the crystal oscillator manager 306 may return the $RGS_1$ value to the sleep controller 304 via the signaling 407.

In operation 408, the sleep controller 304 may determine a sleep duration for the first RAT 302 based on the $RGS_1$ value received from the crystal oscillator manager 306 via the signaling 407. The sleep controller 304 may convert the current $RGS_1$ value associated with the first RAT 302 from the frequency domain into the time domain value and may use this time domain value to determine a period of time that the first RAT 302 should remain in a sleep/idle mode before being reactivated. Further, because the current $RGS_1$ value is associated with the first RAT 302, the sleep controller 304 may accurately determine the first RAT 302's sleep duration, causing the first RAT 302 to avoid timing and slew errors on wake up. At the expiration of the sleep duration, the sleep controller 304 may send a wake up signal 412 to the first RAT 302 to cause the first RAT 302 to resume normal operations.

On resuming normal operations, the first RAT 302 may send identifying information and a request for an RGS value to the crystal oscillator manager 306 via signaling 414 in anticipation of performing re-acquisition operations. As described above, the crystal oscillator manager 306 may retrieve an RGS value associated with the first RAT 302 (i.e., the $RGS_1$ value) and may send the $RGS_1$ value to the first RAT 302 via the signaling 414, and the first RAT 302 may utilize the $RGS_1$ value to successfully perform re-acquisition operations 416 because the $RGS_1$ value is associated with the first RAT 302 rather than another RAT.

FIGS. 5A-5B are data tables 500, 510 illustrating various associations of the RGS value that may be used to ensure that a RGS value used for a RAT's sleep, acquisition, re-acquisition, handoff, and/or inter-RAT measurements operations is actually associated with that RAT or otherwise useful in successfully performing those operations. In some embodiments, the data tables 500, 510 may be referenced by a device processor (e.g., the general purpose processor 206 of FIG. 2, the baseband modem processor 216, the crystal oscillator manager 230, the sleep controller 232 or another controller/processor) on the mobile communication device (e.g., the mobile communication device 200).

With reference to FIGS. 1, 2, and 4-5B, the data table 500 may be a relatively simple look-up table that the device processor may use to maintain direct associations between each RAT on the mobile communication device and their most up-to-date RGS value (or RGS values). For example, the device processor may receive an RGS value (i.e., the $RGS_1$ value) from a first RAT and may store the RGS value and its association with the first RAT in the data table 500. Similarly, the device processor may receive another RGS value (i.e., the $RGS_2$ value) from a second RAT and may store that RGS value in the data table 500 and store an association between that RGS value and the second RAT. Thus, rather than only maintaining one system RGS value used by each RAT on the mobile communication device as is currently practiced in conventional devices, in various embodiments, the device processor may maintain at least one RGS value for each RAT. As a result, the device processor may ensure that various components on the mobile communication device (e.g., the RATs, a GPS unit/module, and/or a sleep controller) are able to use the most relevant RGS values when performing various operations. For example, the device processor may send the $RGS_1$ value to the first RAT to enable the first RAT to perform re-acquisition operations (e.g., as described with reference to FIG. 4).

In some embodiments, the device processor may store and maintain additional information related to RGS values, as illustrated in the data table 510. As described, the contextual associations related to an RGS value may sometimes be referred to generally as the RGS value's "attributes."

In such embodiments, the device processor may store RGS values and associate them with specific RATs as described with reference to the data table 500. Additionally, the device processor may associate an RGS value with various other types of information/attributes that may be useful in enabling the device processor to select the most appropriate RGS value given the current circumstances of the mobile communication device. For example, the identity of a RAT associated with an RGS value may describe, at least in part, the circumstances in which the RGS value was obtained. In such an example, the device processor may use the RGS value for the RAT based on the RAT's association with that RGS value.

In the data table 510, the device processor may associate a first RGS value (i.e., the $RGS_1$ value) with the first RAT, as well as a first subscription (i.e., $subscription_1$) associated with the first RAT at the time the first RGS value was acquired. The device processor may also associate the first RGS value with a base station (i.e., the base station ID 123) and/or service networks (i.e., the service network ID GSM) associated with the first RAT at the time the first RGS value was acquired. In some embodiments, the device processor may also associate the first RGS value with the temperature of the mobile communication device (and/or the temperature of the crystal oscillator) at the time the RGS value is acquired (i.e., a temperate X°).

In some embodiments, the device processor may determine a time/timestamp at which an RGS value is received/reported from a RAT and associate that time with the RGS value. For example, the data table 510 may also include entries for the first RGS value corresponding with a time at which the RGS value was received (e.g., a timestamp A). In such embodiments, at a later time, the device processor may utilize the time associated with an RGS value in selecting an RGS value to use. For example, because RGS values may indicate a snapshot of the circumstances at a particular time, the device processor may attempt to retrieve the most recently received or "freshest" RGS value, which may have the best chance of reflecting the current conditions of the mobile communication device.

Similarly, in some embodiments, the device processor may associate an RGS value with the GPS coordinates of the mobile communication device at the time the RGS value is received from/reported by a RAT. For example, the device processor may store the geographic location of the mobile communication device at the time an RGS value is received/stored (e.g., location/GPS coordinates Q° for the first RGS value). In such embodiments, the device processor may keep a record of the RGS values for particular geographic areas that maintain particular network conditions or have particular frequency errors. Thus, in the event that a requesting entity requests an RGS value (see, for example, FIG. 7A), the device processor may determine the current GPS coordinates of the mobile communication device and retrieve an RGS value with associated GPS coordinates that are closest to the current GPS coordinates of the mobile communication device. This embodiment may enable the mobile communication device to receive service quickly by leveraging the RGS value associated with the mobile network(s) in the current location.

Thus, by associating an RGS value with one or more attributes that may include RATs, subscriptions, base stations, device and/or crystal oscillator temperatures, times/timestamps, geographic locations etc., the device processor may be able to identify an RGS value that may be most suitable for a given situation based on the contextual information observed at the time the RGS value was acquired (i.e., RGS value's stored attributes). For example, a RAT may communicate with two different service providers/networks on behalf of two different subscriptions, and each network may have different frequency errors/RGS values. Thus, in such an example, the device processor may keep separate entries in a data table for a RGS value associated with the RAT and the first subscription, as well as a separate RGS value associated with the RAT and the second subscription. As a result, the device processor may return one of those RGS values to the RAT based on the subscription for which the RAT is currently performing communications.

In some embodiments, the device processor may reference various attributes of an RGS value stored in the data table 510 in order to adjust the RGS value to compensate for small changes in the current conditions of the mobile communication device, mobile network, etc. For example, the device processor may use the temperature associated with the RGS value (i.e., the temperature of the mobile communication device at the time the RGS value was stored) as a reference point when determining the extent to which the RGS value must be adjusted for a RAT based on a current temperature of the mobile communication device and/or crystal oscillator. In another example, because a crystal oscillator's performance may change with age, the device processor may use the time that the RGS value was acquired/received to determine the extent to which it should adjust the RGS value to account for the crystal oscillator's current age.

In some embodiments (see FIGS. 7B-7C), the device processor may compare one or more of an RGS value's attributes with current conditions to determine the likelihood that the RGS value is suitable/reliable for use in acquiring service. In such embodiments, the device processor may determine or calculate a general "confidence" value for each RGS value that will be used on the mobile communication device. Specifically, the confidence value may indicate the likelihood that the RGS value is accurate for the current conditions/network of the mobile communication device. In other words, the device processor may determine a confidence value that is associated with each RGS value by determining the difference between stored characteristics associated with the RGS value and current conditions/characteristics of the mobile communication device.

For example, as described, the device processor may store information associated with the RGS value that may include the current time, device/crystal oscillator temperature, GPS coordinates, base station ID, subscription ID, and various other kinds of information at the time the RGS value was received/reported. Based on this stored information associated with the RGS value, the device processor may compare the stored information with the time, device/crystal oscillator temperature, GPS coordinates, etc. that the mobile communication device is currently experiencing. Based on this comparison, the mobile communication device may determine that the RGS value has a high confidence in response to determining that there is a slight or no difference between the stored attributes associated with the RGS value and the current conditions/characteristics of the mobile communication device. In contrast, the device processor may determine that the RGS value has a low confidence when there is a significant difference between the stored attributes associated with the RGS value and the current characteristics of the mobile communication device. For example, when the crystal oscillator's temperature at the time the RGS value was received was several degrees higher or lower than the current temperature of the crystal oscillator, the device processor may assign a low confidence value to the RGS value due to the potential frequency error difference that may render the value of limited usefulness in obtaining service. In some embodiments, the device processor may utilize the confidence value of an RGS value to determine/adjust the length of time (i.e., the search window) for obtaining service. For example, the device processor may increase the duration of the search window to obtain service when the RGS value has a lower confidence, and decrease the duration of the search window to obtain service when the RGS value has a high confidence.

In some embodiments (e.g., FIGS. 7B-7C), the device processor may utilize the confidence value of an RGS value for various other purposes. For example, the device processor may select the RGS value to send to a requesting entity based on the RGS value that has a highest confidence value to ensure that the requesting entity (e.g., a RAT) may acquire service quickly.

Figure 6:
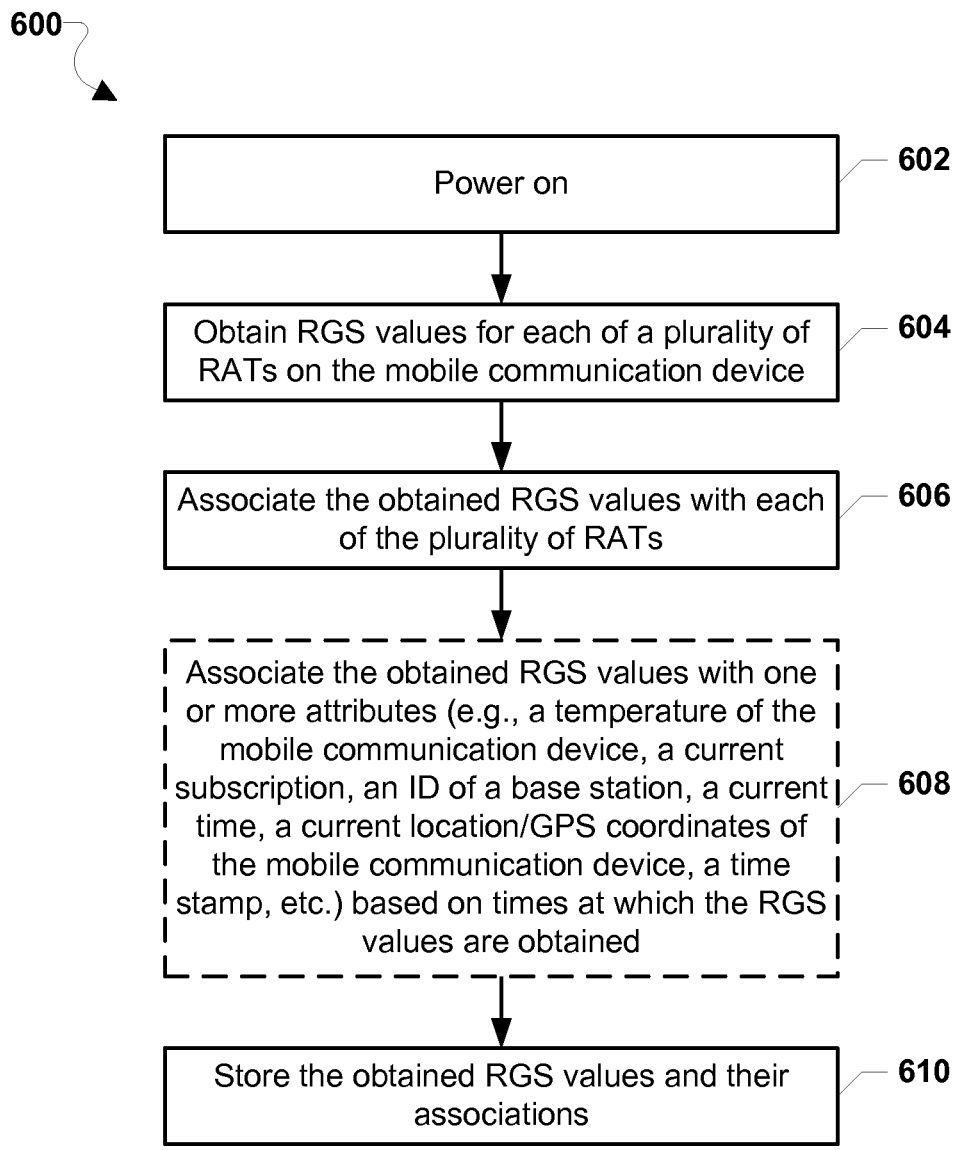
FIG. 6 is a process flow diagram illustrating a method for associating an RGS value with a RAT according to various embodiments.

FIG. 6 illustrates a method 600 for associating RGS values with each of a plurality of RATs on the mobile communication device and storing those RGS value for later use with each of the plurality of RATs according to some embodiments. The method 600 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2).

With reference to FIGS. 1, 2, and 4-6, after powering on in block 602, the device processor may obtain RGS values for each of a plurality of RATs on the mobile communication device, in block 604. In some embodiments, the device processor may receive the RGS values over time from each of the plurality of RATs, for example, as a result of the RATs acquiring new or updated RGS values for their respective base stations/networks and sending those acquired RGS values to the device processor as described (e.g., with reference to FIG. 4).

In block 606, the device processor may associate the obtained RGS values with each of the plurality of RATS, such as by determining the identity of the RATs reporting the RGS values. In some embodiments of the operations performed in block 606, in response to receiving an RGS value from a RAT, the device processor may request information from the RAT that the device processor may use to identify the RAT in order to associate the RGS value with the RAT. In some embodiments, the RAT may include self-identifying information with an RGS value reported to the device processor.

In optional block 608, the device processor may optionally associate the obtained RGS values with one or more attributes based on times at which the RGS value is obtained in block 604. As described (see FIGS. 5A-5B), the device processor may identify contextual information/attributes surrounding an RGS value based on various measurements, readings, etc. that occur at or around the time the RGS value is obtained/received. For example, these attributes may include one or more of a temperature of the mobile communication device, a temperature of the crystal oscillator, a current subscription of the RAT associated with the RGS value, a base station ID used to receive/determine the RGS value, a time or timestamp at which the RGS value is received/obtained, a current location/GPS coordinates of the mobile communication device, etc.

In some embodiments, RGS values may reflect the characteristics of frequency errors when the crystal oscillator on the mobile communication device is at a particular temperature. Because the crystal oscillator's operational frequency may change based on the temperature of the mobile communication device, the device processor may determine the temperature of the mobile communication device at the time an RGS value is obtained and may associate that temperature with the RGS value, thereby enabling the device processor to make adjustments to the RGS value in the event that the temperature of the mobile communication device has changed by a later time.

In block 610, the device processor may store the obtained RGS values and the RGS values' associations, such as in a data table as described (e.g., with reference to FIGS. 5A-5B). As a result of storing the RGS values and their associations/attributes, the device processor may quickly retrieve a specific RGS value associated with a specific RAT that will be the most helpful/suitable for performing various operations related to the RAT. Specifically, the device processor may utilize stored attributes associated with the RGS values to select an RGS value that may be the most suitable/reliable for use by a requesting entity (e.g., a RAT, sleep controller, GPS module, etc.) based on the current conditions of the mobile communication device and/or the network(s) with which the mobile communication device is attempting to communicate. For example, in response to receiving a request for an RGS value from a requesting entity (see FIGS. 7A-7C), the device processor may determine the current temperature of the crystal oscillator and the current GPS coordinates of the mobile communication device and may retrieve an RGS value with stored associations that are closest to the currently observed conditions on the mobile communication device.

Figure 7A:
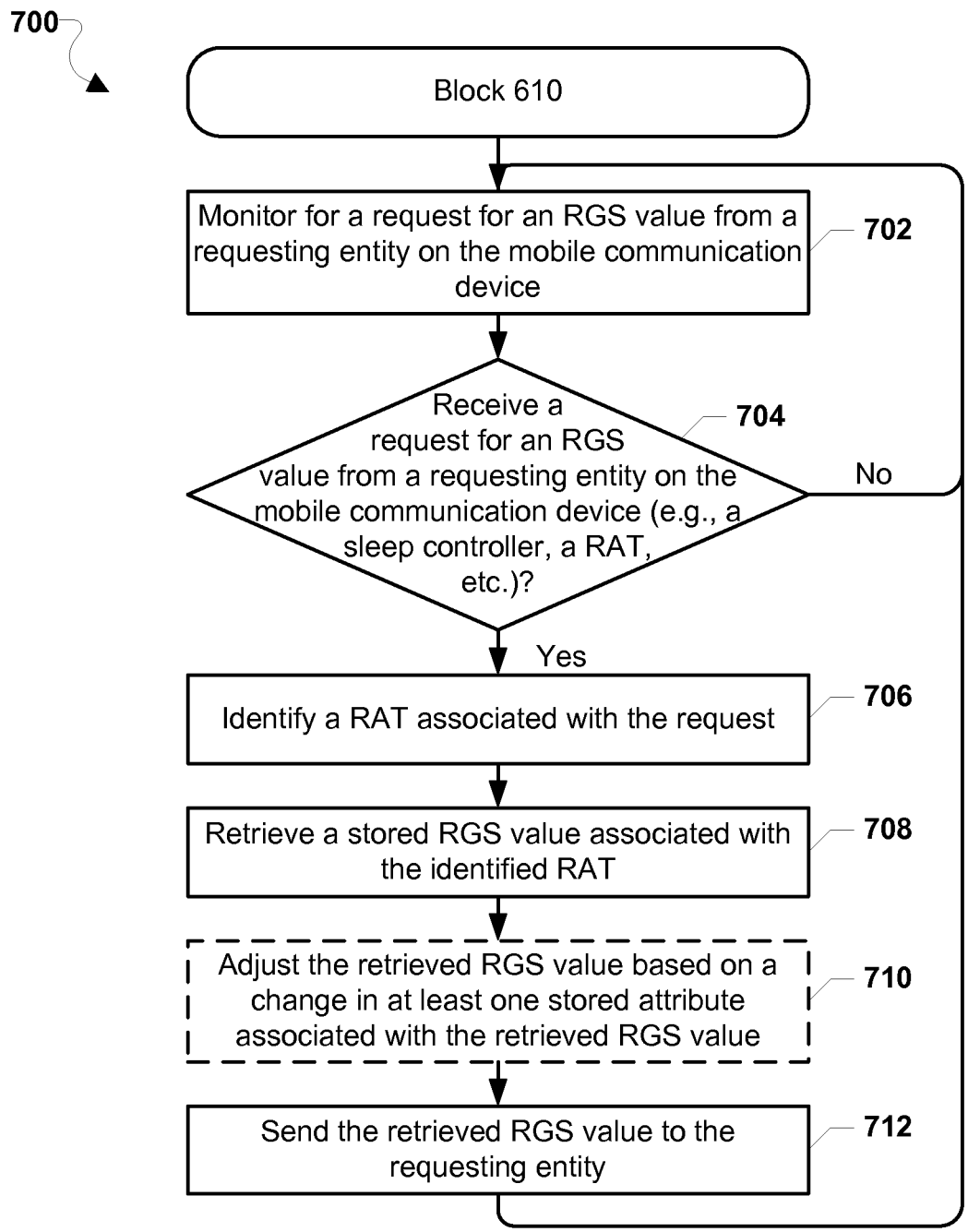
FIG. 7A is a process flow diagram illustrating a method for sending an RGS value associated with a RAT to a requesting entity according to various embodiments.

FIG. 7A illustrates a method 700 for sending a stored RGS value associated with a RAT to a requesting entity according to some embodiments. The method 700 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). The operations of the method 700 may implement embodiments of the operations of the method 600 (see FIG. 6). Thus, with reference to FIGS. 1,2, and 4-7, the device processor may begin performing the operations of the method 700 in response to storing RGS values and their associations in block 610 of the method 600.

In block 702, the device processor may monitor for a request for an RGS value from a requesting entity on the mobile communication device. As described, the requesting entities may include a RAT preparing to perform acquisition or re-acquisition operations based on the RAT's associated RGS value, a sleep controller preparing to calculate a sleep duration for a RAT based on an RGS value associated with that RAT (see FIG. 10), and/or a RAT preparing to perform handover operations/inter-RAT measurements (see FIGS. 11-12). In some embodiments, a requesting entity may include a GPS receiver (e.g., the GPS module 234), which may utilize the RGS value in receiving signals from GPS satellites.

In determination block 704, the device processor may determine whether it has received a request for an RGS value from a requesting entity, and may continue monitoring for a request for an RGS value from a requesting entity in block 702 while no request for an RGS value is received (i.e., while determination block 704="No").

In response to determining that a request for an RGS value from a requesting entity has been received (i.e., determination block 704="Yes"), the device processor may identity a RAT associated with the request in block 706. In some embodiments, the device processor may determine the identity of the RAT associated with the request based on information included in the request. For example, a request from a RAT may include self-identifying information, and a request from a sleep controller may include information indicating the RAT for which the sleep controller is attempting to calculate a sleep duration.

In some embodiments, the device processor may identify the RAT associated with the request based on indirect information, such as by determining an operational status of each of the plurality of RATs on the mobile communication device. For example, the device processor may determine that a certain RAT has just been reactivated and may need to perform acquisition/re-acquisition operations in the near future and may identify that RAT as likely being associated with the request based on that determination.

In block 708, the device processor may retrieve a stored RGS value associated with the RAT identified in block 706, such as by performing a lookup in a data table of associations related to the identified RAT (e.g., the data table 500). In some embodiments of the operations performed in blocks 706, 708, the device processor may identify the RAT associated with the request in addition to at least one of the RAT's current subscription and/or base station, the current temperature of the crystal oscillator, geographic location, etc. The device processor may also retrieve a stored RGS value that is associated with the RAT and at least one of the RAT's current subscription, base station identification, etc., by performing a lookup in an expanded data table of associations (e.g., the data table 510) that may indicate a specific RGS value.

In some embodiments of the operations performed in block 708, the device processor may retrieve a stored RGS value for use by the requesting entity such that the retrieved RGS value has a high confidence value. In such embodiments, the device processor may compare the stored attributes associated with the stored RGS value (e.g., the information associated with the RGS value at the time the RGS value was obtained) with conditions currently observed/experienced/measured on the mobile communication device and/or nearby mobile networks (see FIG. 7B).

In optional block 710, the device processor may adjust the RGS value retrieved in block 708 based on a change in at least one stored attribute associated with the retrieved RGS value. For example, as an RGS value may be specifically useful for a given temperature of the crystal oscillator, the device processor may reference the crystal temperature associated with the retrieved RGS value at the time the retrieved RGS value was stored (e.g., in optional block 608 of the method 600) and compute a difference between the current crystal temperature and the referenced crystal temperature. Based on that temperature difference, the device processor may adjust the RGS value to compensate for the temperature difference's effects on the operational frequency of the crystal oscillator. This adjustment to the RGS value may be particularly useful when the crystal oscillator is a non-temperature-compensated crystal because the operational frequencies of these crystals may vary greatly depending on temperature.

The device processor may send the retrieved RGS value to the requesting entity in block 712, thereby ensuring that the requesting entity receives an RGS value that is highly relevant and suitable for use with the RAT identified in block 706. In some embodiments in which the device processor adjusts the RGS value in optional block 710, the device processor may send the adjusted RGS value to the requesting entity in block 712.

The device processor may repeat the above operations in a loop by again monitoring for a request for an RGS value from a requesting entity in block 702.

In some embodiments, in addition to receiving RGS values from RATs, the device processor may also receive RGS values from a GPS module (e.g., the GPS module 234) on the mobile communication device. In such embodiments, one or more RGS values may be associated with the GPS module and may be sent to the GPS module on request, such as by performing operations similar to those operations described with reference to the method 700. In some embodiments, the device processor may adjust the RGS values before sending the RGS value to the GPS unit/module to reflect changes in time, temperature, geographic location, etc.

Figure 7B:
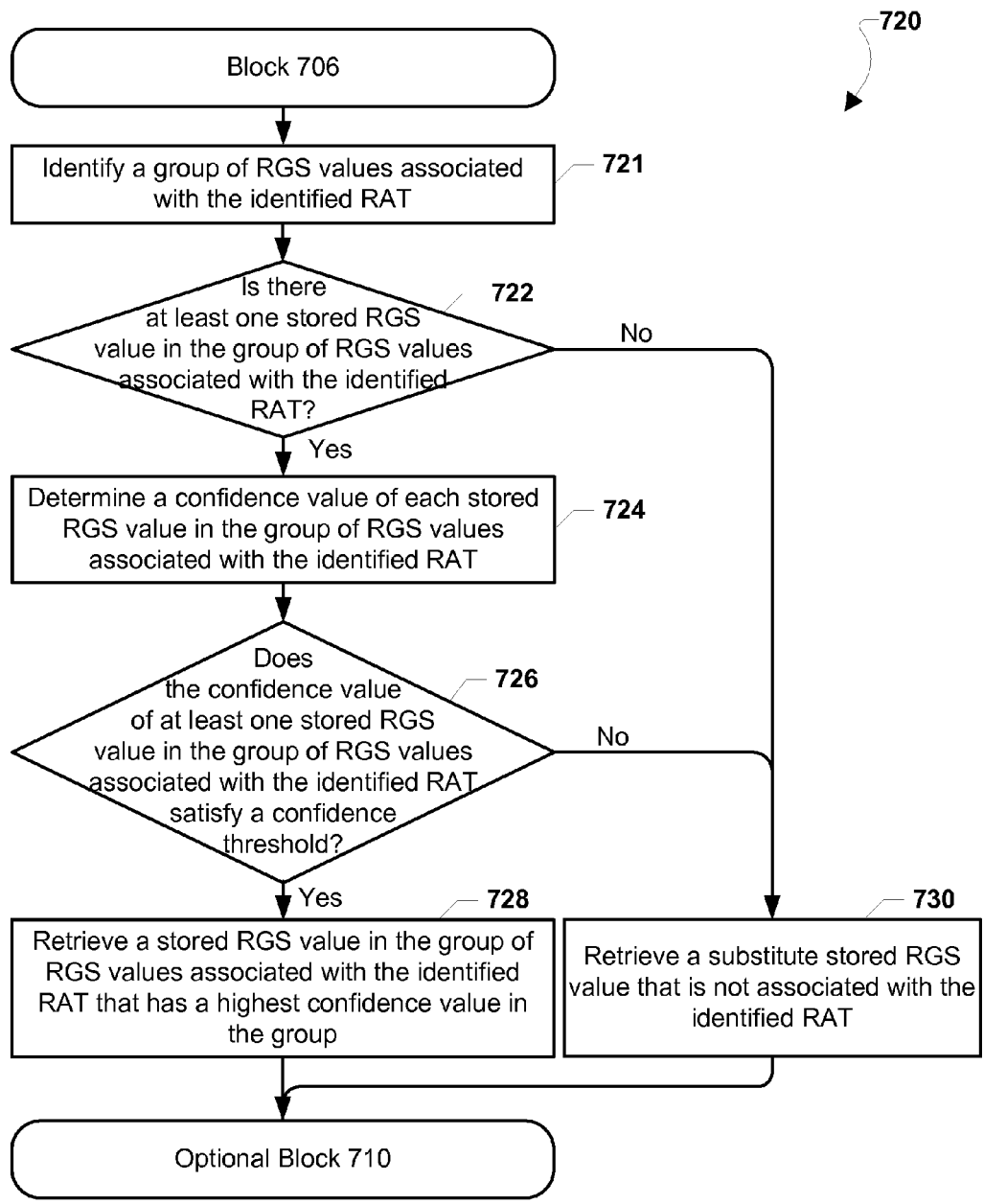
FIG. 7B is a process flow diagram illustrating a method for obtaining an RGS value based on the confidence value of the RGS value according to various embodiments.

FIG. 7B illustrates a method 720 for retrieving a stored RGS value associated with a RAT based on the stored RGS value's confidence value according to some embodiments. The method 720 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2).

As described, an RGS value may reflect, among other things, the frequency error of a base station/network at the time at which the RGS value is received/obtained in light of a certain combination of circumstances and/or conditions observed at that time. For example, an RGS value may reflect the frequency error of a certain base station on a particular mobile network (e.g., GSM) at a particular geographic location and for a given temperature of the crystal oscillator. As such, the RGS value may have a particularly high usefulness under circumstances that are similar or identical to those circumstances during which the RGS value was initialed obtained/received. However, over time, the current conditions experienced/observed/measured on mobile communication device may change, thereby affecting the likelihood or "confidence" that the RGS value will be suitable/reliable for use in light of the changed conditions. In the above example, the device processor may determine that the RGS value has a low confidence/likelihood of being useful in light of a substantial change in the crystal oscillator's temperature.

As a result, in some embodiments, the device processor may take changes in conditions/circumstances of the mobile communication device into account when determining the extent to which an RGS value may be helpful/useful to a requesting entity in acquiring service, facilitating a handover operation, performing sleep calculations, etc. based on the current conditions/circumstances of the mobile communication device.

The operations of the method 720 may implement embodiments of the operations in block 708 of the method 700 (see FIG. 7A). Thus, with reference to FIGS. 1, 2, and 4-7B, the device processor may begin performing the operations of the method 720 in response to identifying a RAT associated with a request for an RGS value in block 706 of the method 700.

In block 721, the device processor may identify a group of RGS values associated with the RAT identified in block 706 of the method 700, such as by referencing a data table (e.g., the data tables 500, 510 of FIGS. 5A-5B) that stores associations between RGS values and RATs, among other things, to identity any RGS values that are associated with the RAT identified in block 706 of the method 700.

In determination block 722, the device processor may determine whether there is at least one stored RGS value in the group of RGS values associated with the identified RAT. In response to determining that there is at least one stored RGS value associated with the identified RAT (i.e., determination block 722="Yes"), the device processor may determine a confidence value for each stored RGS value in the group of RGS values associated with the identified RAT, in block 724. In some embodiments of the operations performed in block 724, the device processor may determine/observe/measure various current conditions/circumstances of the mobile communication device—such as the current time, crystal-oscillator temperature, nearby base stations, accessible mobile networks, current geographic location/GPS coordinates—and compare the current conditions/circumstances with the stored attributes associated with the RGS value that reflect the historical conditions/circumstances present at the time the RGS value was observed/received. The confidence value may be based on the comparison and may indicate the extent to which the current conditions/circumstances match or differ from the attributes associated with the RGS value. In other words, the confidence value may indicate how suitable/reliable the RGS value is for use given the change in conditions/circumstances as described, such that lower confidence values may reflect a higher degree of change and a higher confidence may indicate a lower degree of change.

In some embodiments, the device processor may determine a confidence value for each attribute associated with an RGS value. For example, there may be an 80% confidence that an RGS value will be useful/reliable based on the current temperature of the crystal oscillator, but there may be a 20% confidence that the RGS value will be useful/reliable given the mobile communication device's current geographic location.

In some embodiments, the confidence value may be a value that indicates the overall degree of change of all of the attributes associated with RGS value taken together (i.e., a composite confidence value). For example, the confidence value may indicate that, overall, the RGS value has a 90% confidence of being useful/reliable given the current conditions/circumstances of the mobile communication device. In such embodiments, the composite confidence value may be based on the individual confidence values of the conditions associated with the RGS value given the current conditions/circumstances.

In determination block 726, the device processor may determine whether the determined confidence value of at least one stored RGS value in the group of RGS values associated with the identified RAT satisfies a confidence threshold. In other words, the device processor may determine whether there is any RGS value associated with the identified RAT that has a confidence value that is greater than or equal to the confidence threshold.

In some embodiments, the confidence threshold may be a minimum confidence value at which an RGS value may be expected to be reliable or useful in obtaining service. For example, an RGS value with a confidence value that does not satisfy the confidence threshold may not be especially useful in facilitating inter-RAT measurements, handover operations, acquisition/reacquisition of service, programming sleep timing, etc. For example, a RAT using an RGS value that is associated with especially old or outdated information may need a relatively long search window to acquire service because the RGS value is likely inaccurate given the current circumstances/conditions of the mobile communication device.

In some embodiments of the operations performed in determination block 726, the confidence threshold value may be an overall confidence threshold value, and the device processor may compare the confidence threshold value to the overall or composite confidence value of an RGS value to determine whether the RGS value can be expected to be generally useful.

In some embodiments, the device processor may compare a confidence value for each attribute associated with the RGS value to the confidence threshold. In such embodiments, the device processor may determine that an RGS value satisfies the confidence threshold when each confidence value (or a certain percentage of confidence values) satisfies the confidence threshold.

In response to determining that the confidence of at least one stored RGS value in the group of RGS values associated with the identified RAT satisfies (e.g., is greater than or equal to) the confidence threshold (i.e., determination block 726="Yes"), the device processor may retrieve a stored RGS value that has a highest confidence value within the group of RGS values associated with the identified RAT in block 728. By retrieving the stored RGS value with the highest confidence value, the device processor may ensure that the most useful RGS value is provided to the requesting entity in block 712 of the method 700, as described (see FIG. 7A).

In response to determining that there are no stored RGS values associated with the identified RAT (i.e., determination block 722="No") or in response to determining that no stored RGS value in the group of RGS values associated with the identified RAT has a confidence value that satisfies the confidence threshold (i.e., determination block 726="No"), the device processor may retrieve a substitute stored RGS value that is not associated with the identified RAT in block 730. In other words, in the event that there are no RGS values that are associated with the identified RAT or in the event that no RGS value associated with the identified RAT has a confidence value that satisfies the confidence threshold, the device processor may attempt to find another RGS value associated with another RAT that may be useful to the requesting entity (see, e.g., FIG. 7C).

Regardless of whether an RGS value associated with the identified RAT is retrieved in block 728 or a substitute stored RGS value associated with another RAT is retrieved in block 730, the device processor may optionally adjust the retrieved RGS value based on a change in at least one stored attribute associated with the retrieved RGS value in optional block 710 of the method 700 as described. In some embodiments, by adjusting the retrieved RGS value, the device processor may increase the likelihood that the RGS value will useful to the requesting entity (i.e., the RGS value's confidence value).

Figure 7C:
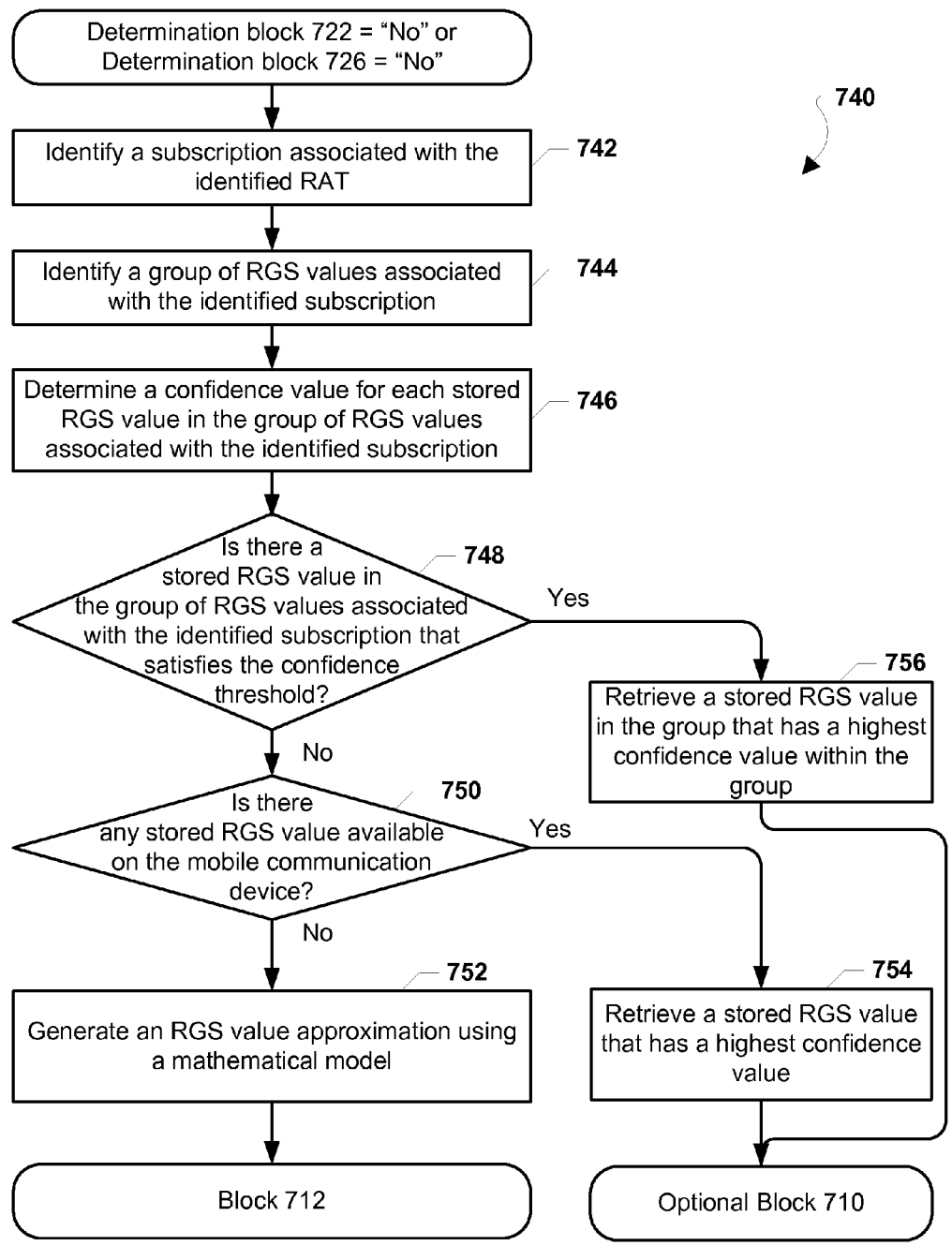
FIG. 7C is a process flow diagram illustrating a method for obtaining a substitute RGS value for a RAT in response to determining that the RAT is not associated with any RGS value or is not associated with an RGS value that satisfies a confidence threshold according to various embodiments.

FIG. 7C illustrates a method 740 for retrieving a stored RGS value associated with an identified RAT's subscription in the event that there are no RGS values directly associated with the identified RAT according to some embodiments. The method 740 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). The operations of the method 740 may implement embodiments of the operations of block 730 of the method 720 (see FIG. 7B). With reference to FIGS. 1, 2, and 4-7C, the device processor may begin performing the operations of the method 740 in response to determining that there is no stored RGS value associated with the identified RAT (determination block 722="No"). In some embodiments, the device processor may begin performing the operations of the method 740 in response to determining that there are no RGS values associated with the identified RAT that satisfy a confidence threshold (i.e., determination block 726="No").

In block 742, the device processor may attempt to identify a subscription associated with the RAT identified in block 706 of the method 700, such as by performing a lookup operation in a data table of associations of RGS values (e.g., the data tables 500, 510 of FIGS. 5A-5B). In some embodiments, in response to determining that there are no RGS values (or no RGS values with sufficient confidence values) associated with the identified RAT, the device processor may attempt to retrieve an RGS value associated with the same subscription associated with the identified RAT. In such embodiments, there may be a likelihood that an RGS value associated with the same subscription but a different RAT may be useful to the requesting entity in performing acquisition/re-acquisition service, inter-RAT measurements, handoff operations, sleep scheduling, GPS signal reception, etc. For instance, even though there may be no RGS values or only low-confidence RGS values associated with the identified RAT, RGS values from a different RAT supporting the same subscription as that of the identified RAT may share similar associations and, therefore, may be a satisfactory RGS value. Thus, in block 744, the device processor may identify a group of RGS values associated with the subscription identified in block 742.

In block 746, the device processor may determine a confidence value for each stored RGS value in the group of RGS values associated with the identified subscription, such as by performing operations similar to those operations described with reference to block 724 of the method 720 (see FIG. 7B). In other words, the device processor may determine how likely each of the RGS values in the group will be useful for the requesting entity, such as based on a comparison of the stored attributes associated with each RGS value and the current conditions/circumstances observed or measured on the mobile communication device, as described.

In determination block 748, the device processor may determine whether there is a stored RGS value in the group of RGS values associated with the identified subscription that satisfies the confidence threshold, such as by performing operations similar to those described with reference to determination block 726 of the method 720 (see FIG. 7B). In response to determining that there is an RGS value in the group of RGS values associated with the identified subscription that satisfies the confidence threshold (i.e., determination block 748="Yes"), the device processor may retrieve a stored RGS value in the group of RGS values associated with the identified subscription that has a highest confidence value within that group in block 756, thereby ensuring that the RGS value sent to the requesting entity in block 712 of the method 700 has the highest likelihood of being useful to that requesting entity.

In response to determining that there is no RGS value in the group of RGS values associated with the identified subscription that satisfies the confidence threshold (i.e., determination block 748="No"), the device processor may determine whether there is any stored RGS value available on the mobile communication device in determination block 750. In other words, in response to determining that there is no RGS value in the group of RGS values associated with the identified subscription, the device processor may attempt to identify any other RGS values stored on the mobile communication device.

In response to determining that there is a stored RGS value available (i.e., determination block 750="Yes"), the device processor may retrieve a stored RGS value that has a highest confidence in block 754. In some embodiments, in the event that there is no RGS value associated with the identified subscription that has a high confidence value to satisfy the confidence threshold, the device processor may select from any stored RGS value (i.e., associated with the identified subscription or not) to retrieve a stored RGS value that has the highest available confidence value. For example, the device processor may retrieve an RGS value that is not associated with the identified subscription (and/or the identified RAT), but that is associated with conditions that are similar to the conditions currently observed/measured on the mobile communication device.

In response to determining that there are no stored RGS values available on the mobile communication device (i.e., determination block 750="No"), the device processor may generate an RGS value approximation using a mathematical model in block 752. In some embodiments, the device processor may rely on a mathematical model used to predict a frequency error based on the current temperature of the crystal oscillator using known methods. The device processor may rely on the mathematical model, for example, when there are no stored RGS values available on the mobile communication device).

In response to retrieving a stored RGS value in block 756 or 754, the device processor may adjust the retrieved or RGS value based on a change in at least one stored attribute associated with the retrieved RGS value in optional block 710 of the method 700 (see FIG. 7A) as described. Alternatively, in response to generating an RGS value approximation using a mathematical model in block 752, the device processor may send the approximated RGS value to the requesting entity in block 712 of the method 700 as described.

Figure 8A:
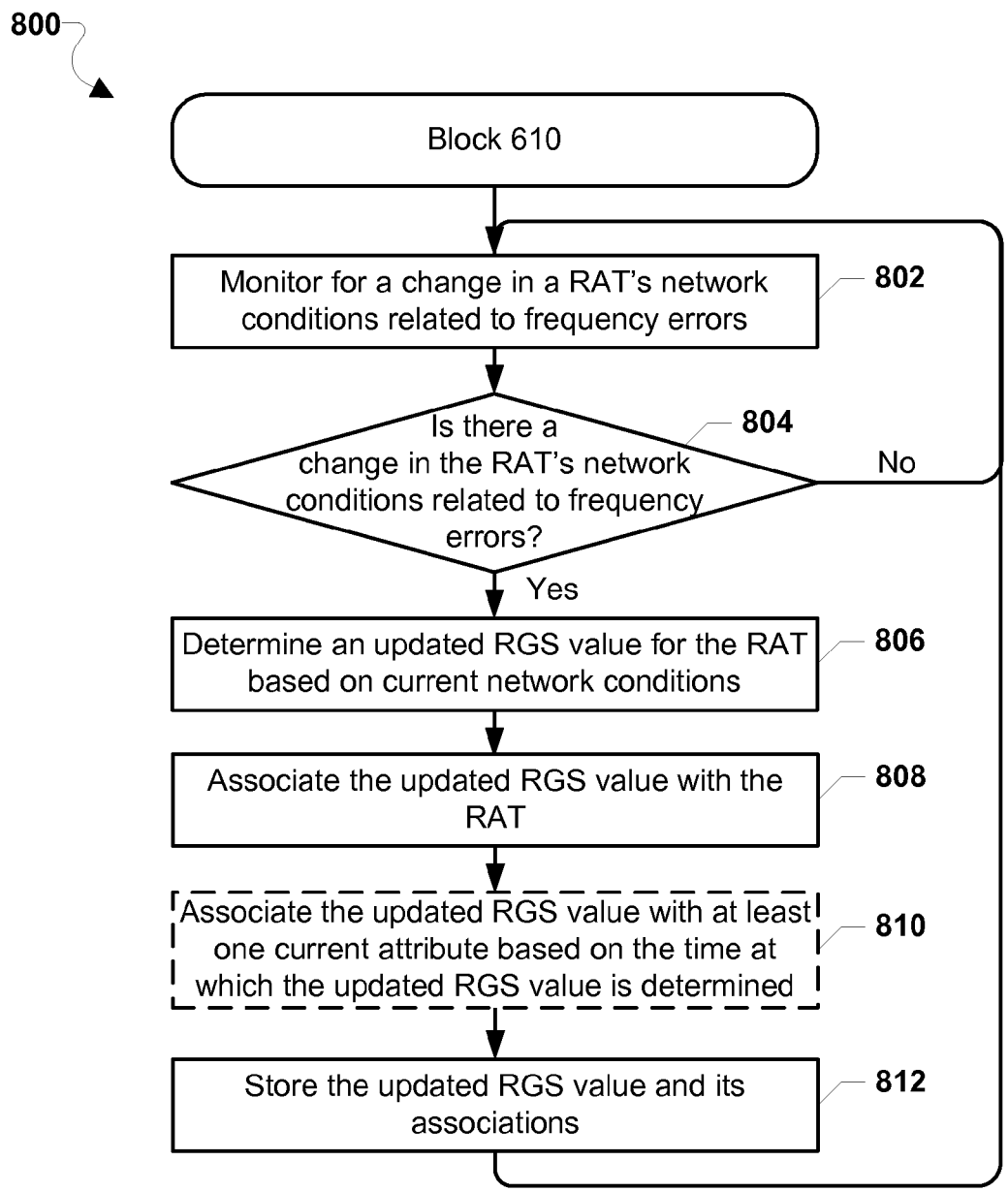
FIG. 8A is a process flow diagram illustrating a method for updating an RGS value associated with a RAT according to various embodiments.

FIG. 8A illustrates a method 800 for associating an updated RGS value with a RAT and storing the updated RGS value for later use by or for that RAT according to some embodiments. The method 800 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). The operations of the method 800 may implement embodiments of the operations of the method 600 (see FIG. 6). Thus, with reference to FIGS. 1, 2, and 4-8A, the device processor may begin performing the operations of the method 800 in response to storing RGS values and their associations in block 610 of the method 600.

In block 802, the device processor may monitor for a change in a RAT's network conditions related to frequency errors, such as by detecting when a RAT performs a reselection operation to camp on a different cell/base station that may have a different frequency error. In some embodiments of the operations of block 802, the device processor may monitor for communications or signals received directly from a particular RAT (e.g., the signaling 403, 405 of FIG. 4) indicating that the RAT has received or determined an updated RGS value.

In determination block 804, the device processor may determine whether there is a change in a RAT's network conditions related to frequency errors, and may continue monitoring for a change in a RAT's network conditions in block 802 as long as there is no change in a RAT's network conditions related to frequency errors (i.e., while determination block 804="No").

In response to determining that there has been a change in a RAT's network conditions related to frequency errors (i.e., determination block 804="Yes"), the device processor may determine an updated RGS value for the RAT based on current network conditions of the RAT in block 806. For example, the device processor may compare the frequency of communications received from the RAT's base station with an expected frequency, and based on that comparison, may derive an updated RGS value that reflects the base station's current frequency errors. In some embodiments, the device processor may calculate the updated RGS value by determining the frequency errors of the RAT's current base station and adjusting those frequency errors based on operational frequency of the crystal oscillator at the current temperature of the mobile communication device.

In block 808, the device processor may associate the updated RGS value with the RAT, such as by replacing a previous RGS value associated with the RAT with the updated RGS value in a data table of RGS value associations. In some embodiments, the device processor may also associate the updated RGS value with the RAT's current subscription and with the RAT's current base station, for example. Further, in optional block 810, the device processor may associate the updated RGS value with at least one current attribute based on the time the updated RGS value is determined in block 806. For example, the device processor may determine the current temperature of the mobile communication device and may associate that temperature with the updated RGS value in order to be able to adjust the updated RGS value at a later time in the event that the device's temperature has changed and has affected the operational frequency of the crystal oscillator.

In block 812, the device processor may store the updated RGS value and its association to the RAT (and, optionally, its association with at least one current attribute), such as by storing the updated RGS value in memory and updating the updated RGS value's associations maintained in a data table maintained in memory (e.g., the memory 214).

The device processor may repeat the above operations in a loop by again monitoring for a change in a RAT's network conditions related to frequency errors in block 802.

Figure 8B:
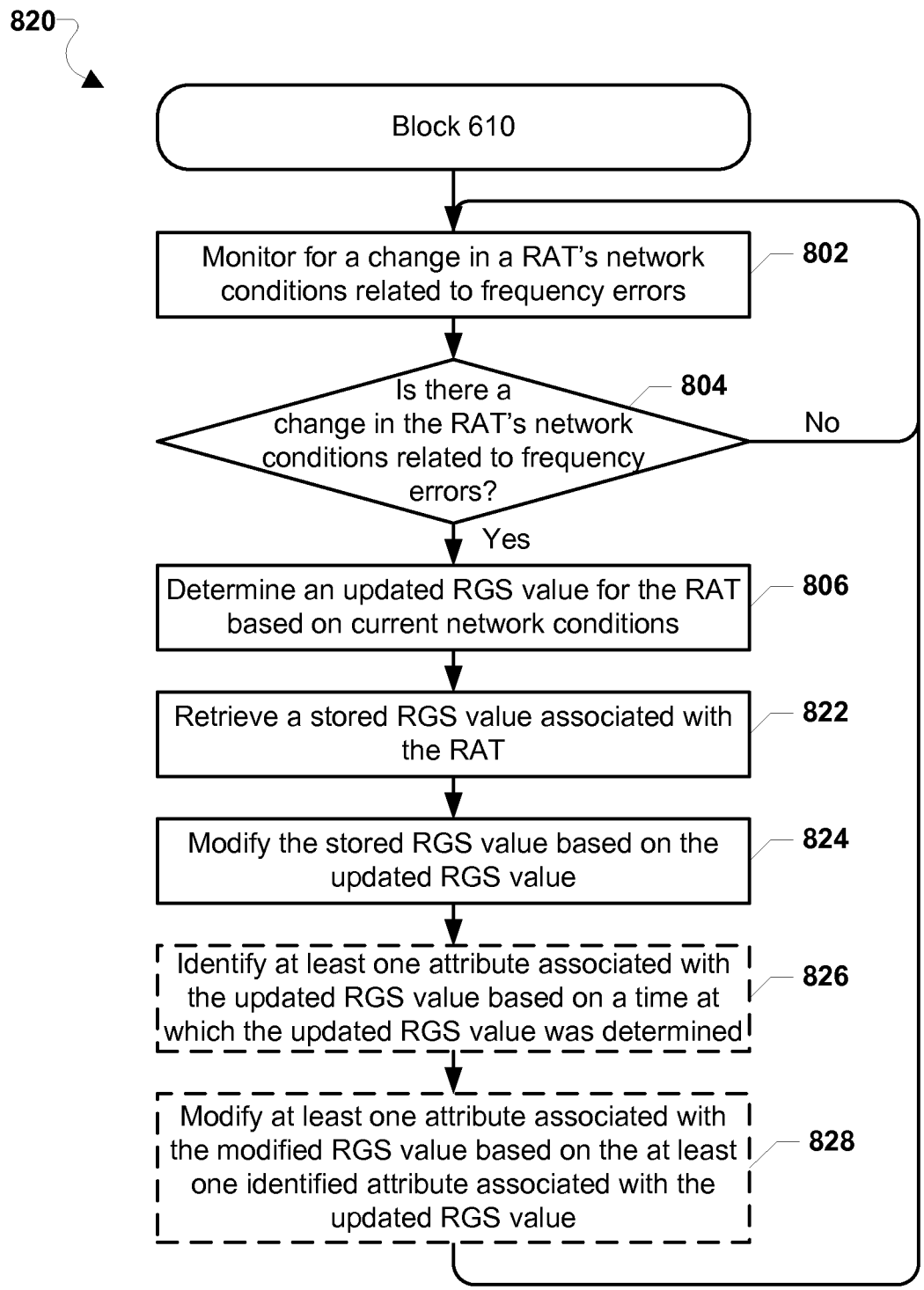
FIG. 8B is a process flow diagram illustrating a method for updating an RGS value associated with a RAT according to various embodiments.

FIG. 8B illustrates a method 820 for modifying a stored RGS value based on an updated RGS value determined based on current network conditions according to some embodiments. The method 820 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2).

In some embodiments (e.g., as described with reference to FIG. 8A), the device processor may receive/determine updated RGS values for RATs based on current network conditions. However, an updated RGS value may occasionally reflect spurious or inaccurate information that may be of little use in compensating for a base station's frequency error. For example, the base station may momentarily report inaccurate frequency error measurements due to a processing error in the mobile network. To guard against the possibility that an updated RGS value includes inaccurate or spurious information, the device processor may perform various operations in the method 820 to modify existing, stored RGS values with updated RGS values instead of automatically replacing those existing RGS values (e.g., as described with reference to FIG. 8A).

With reference to FIGS. 1, 2, and 4-8B, the operations of the method 820 may implement embodiments of the operations of the method 600 (see FIG. 6). Thus, the device processor may begin performing the operations of the method 800 in response to storing RGS values and their associations in block 610 of the method 600.

The device processor may perform operations in blocks 802-806 that are the same or similar to the operations described with reference to blocks 802-806 of the method 800 (see FIG. 8A). In other words, the device processor may monitor for a change in a RAT's network conditions related to frequency errors in block 802, determine whether there is a change in the RAT's network conditions related to frequency errors in determination block 804, and in response to determining that there is a change (i.e., determination block 804="Yes"), the device processor may determine an updated RGS value for the RAT based on the current network conditions in block 806.

In block 822, the device processor may retrieve a stored RGS value that is associated with the RAT, such as by accessing a data table of associations and performing a lookup operating in the data table to identify an RGS value that is associated with the RAT.

In block 824, the device processor may modify the stored RGS value based on the updated RGS value. In some embodiments of the operations performed in block 824, the device processor may adjust the retrieved RGS value, such as by replacing the retrieved RGS value with an average of the retrieved RGS value and the updated RGS value, thereby limiting the possibility that the updated RGS value will substantially degrade the usefulness of the RGS value (i.e., due to inaccuracies introduced with the updated RGS value).

In some embodiments, the device processor may maintain one or more previous versions of an RGS value, including the most recently received/determined RGS value. In response to determining the updated RGS value in block 806, the device processor may retrieve the one or more previous versions of the RGS value and may calculate a new RGS value for use by one or more components on the mobile communication device based on the previously stored versions of the RGS value and the updated RGS value. For example, the new RGS value may be an average of the updated RGS value and four previously stored versions of the RGS value. By utilizing more than one previously stored version of the RGS value, the device processor may further decrease the likelihood that an updated RGS version will substantially impair the usefulness of the RGS version.

In optional block 826, the device processor may identify at least one attribute associated with the updated RGS value based on the time at which the updated RGS value was determined in block 806. As described, the device processor may identify the at least one attribute based on various factors or circumstances currently experienced on the mobile communication device, such as the device/crystal oscillator temperature, geographic location, active subscription, base station, etc. associated with the RAT when the updated RGS value was determined.

In optional block 828, the device processor may modify at least one attribute associated with the modified RGS value based on the at least one attribute associated with the updated RGS value identified in optional block 826. In some embodiments, modifying the stored RGS value's associations may include modifying entries in a data table of associations, such as by replacing a device temperature value associated with the stored RGS value with the average device temperature of the previously stored device temperature value and the device temperature value associated with the updated RGS value. By modifying (instead of replacing/overwriting) the conditions, characteristics, circumstances, etc. associated with the stored RGS value, the device processor may ensure that spurious information related to the updated RGS value does not substantially impact the usefulness of the stored RGS value.

The device processor may repeat the above operations of the method 820 in a loop by again monitoring for a change in a RAT's network conditions related to frequency errors in block 802.

Figure 9:
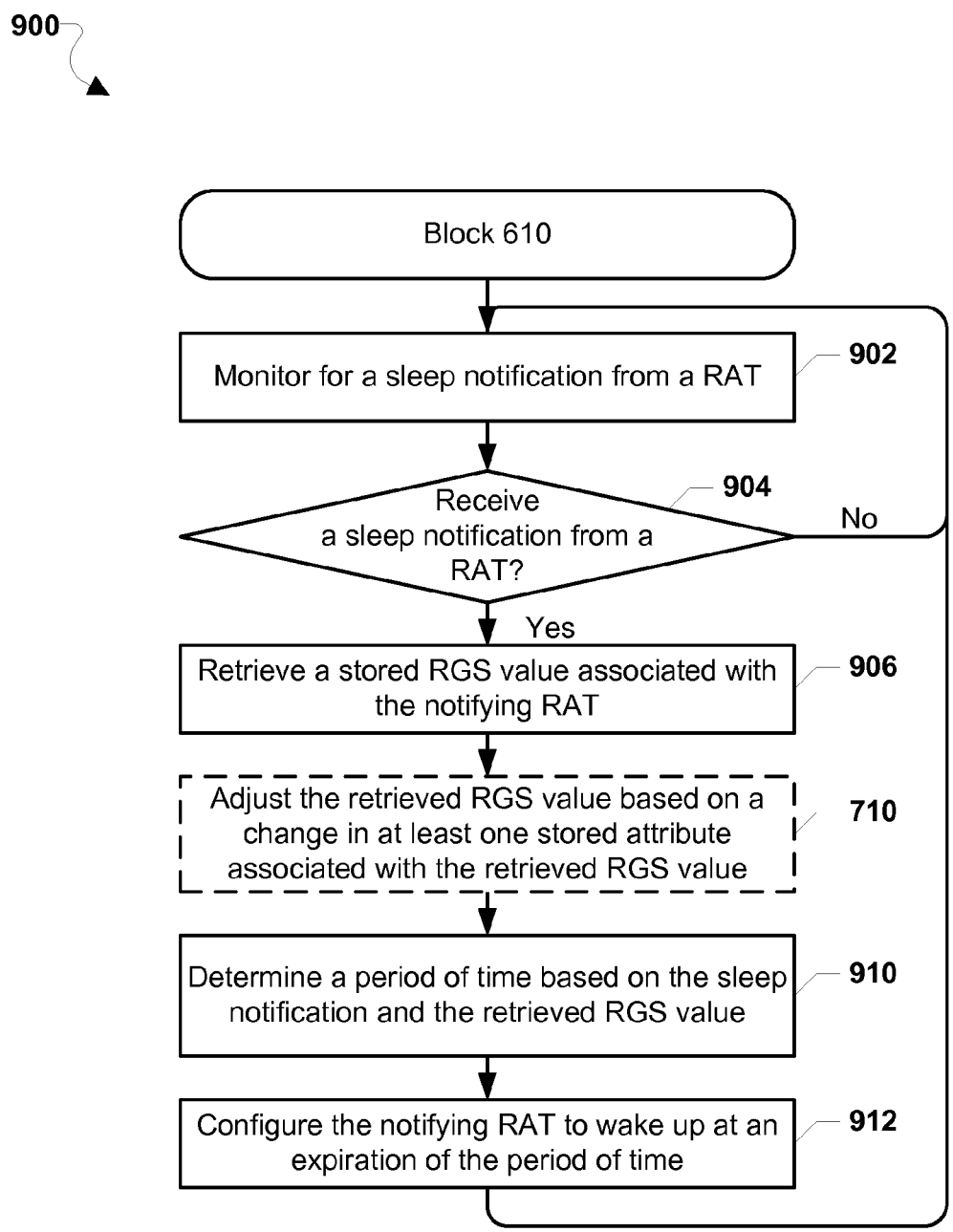
FIG. 9 is a process flow diagram illustrating a method for configuring a RAT to sleep based on an RGS value associated with the RAT according to various embodiments.

FIG. 9 illustrates an embodiment method 900 for configuring a RAT to sleep for a period of time based on an RGS value associated with the RAT according to some embodiments. The method 900 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). With reference to FIGS. 1, 2, and 4-9, the operations of the method 900 may implement embodiments of the operations of the method 600 (see FIG. 6). Thus, the device processor may begin performing the operations of the method 900 in response to storing RGS values and their associations in block 610 of the method 600.

In block 902, the device processor may monitor for a sleep notification from a RAT. In some embodiments, the sleep notification may be a signal or other indication sent from a RAT indicating that the RAT is about to enter a sleep or idle mode. For example, in anticipation of a temporary interruption of a first RAT's access to a shared RF resource on a DSDS communication device in favor of a second RAT, the first RAT may send a notification to the device processor indicating that the first RAT may be entering a sleep/idle mode while the second RAT has access to the shared RF resource. In some embodiments, instead of receiving a sleep notification directly from the RAT, the device processor may determine when the RAT may need to perform sleep/idle mode operations, such as by monitoring the RAT's performance schedule and/or by determining when circumstances occurring on the mobile communication device indicate that the RAT may need to perform sleep operations.

In determination block 904, the device processor may determine whether a sleep notification has been received from a RAT, and may continue monitoring for a sleep notification from a RAT in block 902 as long as no sleep notification has been received from a RAT (i.e., while determination block 904="No").

In response to determining that a sleep notification has been received from a RAT (i.e., determination block 904="Yes"), the device processor may retrieve an RGS value associated with the notifying RAT in block 906. In some embodiments, the device processor may identify the notifying RAT based on the request and/or based on indirect information received from other components on the mobile communication device identifying the notifying RAT.

In optional block 710, the device processor may adjust the received RGS value based on a change in at least one stored attribute associated with the retrieved RGS value by performing operations similar to those described in optional block 710 of the method 700. For example, the device processor may adjust the received RGS value based on a temperature change of the mobile communication device to compensate for the effects of that temperature change on the operation frequency of the crystal oscillator.

In block 910, the device processor may determine a period of time based on the sleep notification and the received RGS value. In some embodiments of the operations performed in block 910, the device processor may convert the RGS value obtained in block 906 (and optionally adjusted in optional block 908) into a time-domain value and may determine a sleep duration for the notifying RAT based on the time-domain value. In some embodiments, the device processor may configure the notifying RAT to sleep for the period of time determined in block 910. In some embodiments, rather than configuring the notifying RAT to sleep for the determined period of time, the notifying RAT may independently initiate sleep operations as part of its normal operations without specific instructions or assistance from the device processor.

In block 912, the device processor may configure the RAT to wake up at an expiration of the determined period of time, such as by counting down from when the notifying RAT began sleep operations until the period of time determined in block 910 has elapsed.

The device processor may repeat the above operations of the method 900 in a loop by again monitoring for a sleep notification from a RAT in block 902.

Figure 10:
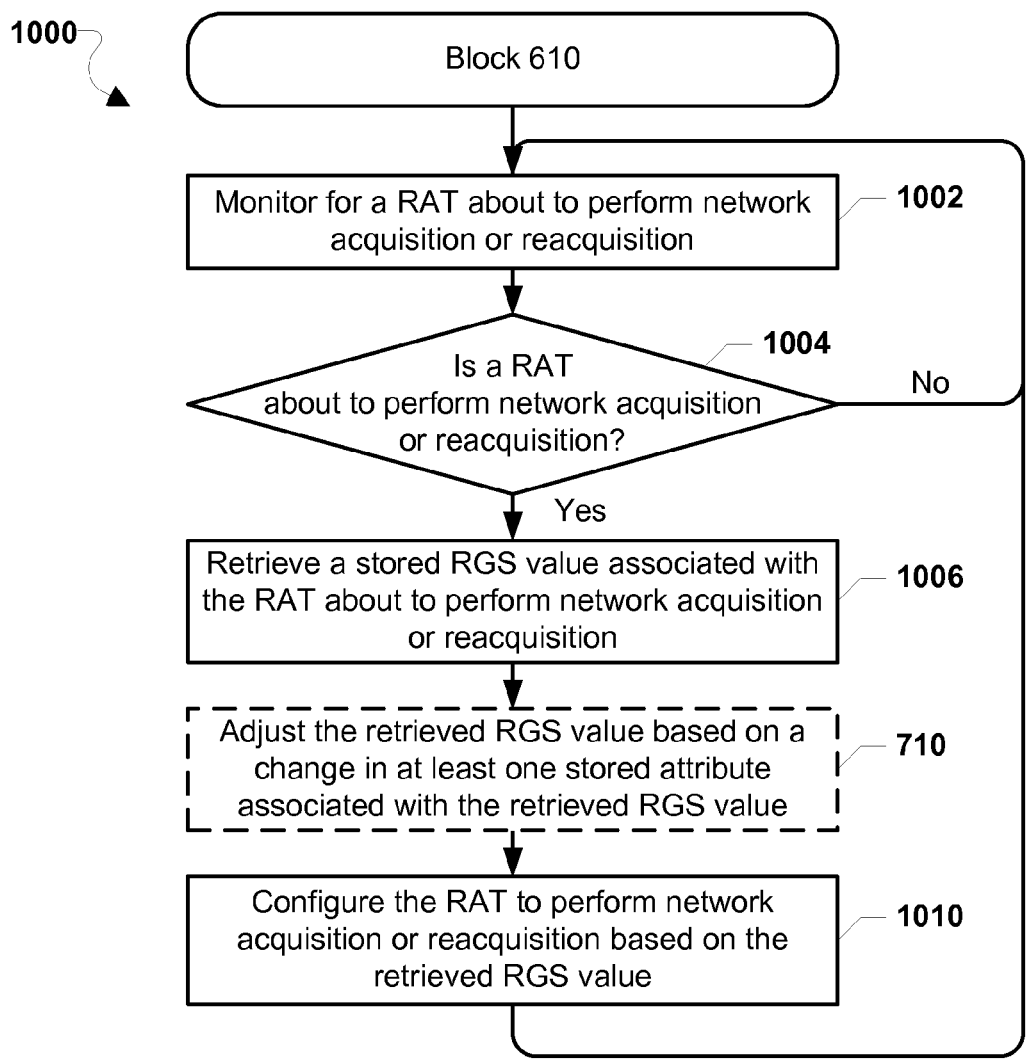
FIG. 10 is a process flow diagram illustrating a method for configuring a RAT to perform network acquisition or reacquisition based on an RGS value associated with the RAT according to various embodiments.

FIG. 10 illustrates a method 1000 for configuring a RAT to perform acquisition or re-acquisition operations by utilizing an RGS value associated with the RAT according to some embodiments. The method 1000 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). With reference to FIGS. 1, 2, and 4-10, the operations of the method 1000 may implement embodiments of the operations of the method 600 (see FIG. 6). Thus, the device processor may begin performing the operations of the method 1000 in response to storing RGS values and their associations in block 610 of the method 600.

In block 1002, the device processor may monitor for a RAT that is about to perform network acquisition or reacquisition. In some embodiments, the device processor may monitor for signals indicating that a RAT has recently been activated, indicating that the RAT may soon need to perform acquisition operations to establish service with a base station, or that the RAT has recently be reactivated from a sleep or idle mode, indicating that the RAT may need to perform reacquisition operations to reestablish service with a base station that was lost during the sleep/idle mode.

In determination block 1004, the device processor may determine whether a RAT is about to perform network acquisition or reacquisition operations, and may continue monitoring for RAT that is about to perform network acquisition or reacquisition operations in block 1002 so long as a RAT is not about to perform network acquisition or reacquisition operations (i.e., determination block 1004="NO").

In response to determining that a RAT is about to perform network acquisition or reacquisition operations (i.e., determination block 1004="Yes"), the device processor may obtain a stored RGS value associated with the RAT about to perform network acquisition or re-acquisition operations, in block 1006. As described, the device processor may perform a look-up in a data table of associations stored in memory (e.g., the data tables 500, 510 described with reference to FIGS. 5A-5B) to identify the RGS value that is associated with the RAT about to perform acquisition/re-acquisition operations, and the device processor may retrieve that RGS value from memory.

In optional block 710, the device processor may adjust the retrieved RGS value based on a change in at least one stored attribute associated with the retrieved RGS value, such as by performing operations similar to those in optional block 710 of the method 700 (see FIG. 7). For example, the device processor may adjust the RGS value retrieved in block 1006 to compensate for any change in temperature of the mobile communication device that may have occurred since the RGS value was initially obtained (see, e.g., block 604 of the method 600) and associated with the RAT.

In block 1010, the device processor may configure the RAT to perform network acquisition or acquisition operations based on the RGS value obtained in block 1006 (and optionally adjusted in optional block 1008). In some embodiments, the device processor may utilize the obtained RGS value to determine the frequencies needed for the RAT to communicate with and receive service from a nearby base station.

The device processor may repeat the above operations of the method 1000 in a loop by again monitoring for a sleep notification from a RAT in block 1002.

Figure 11:
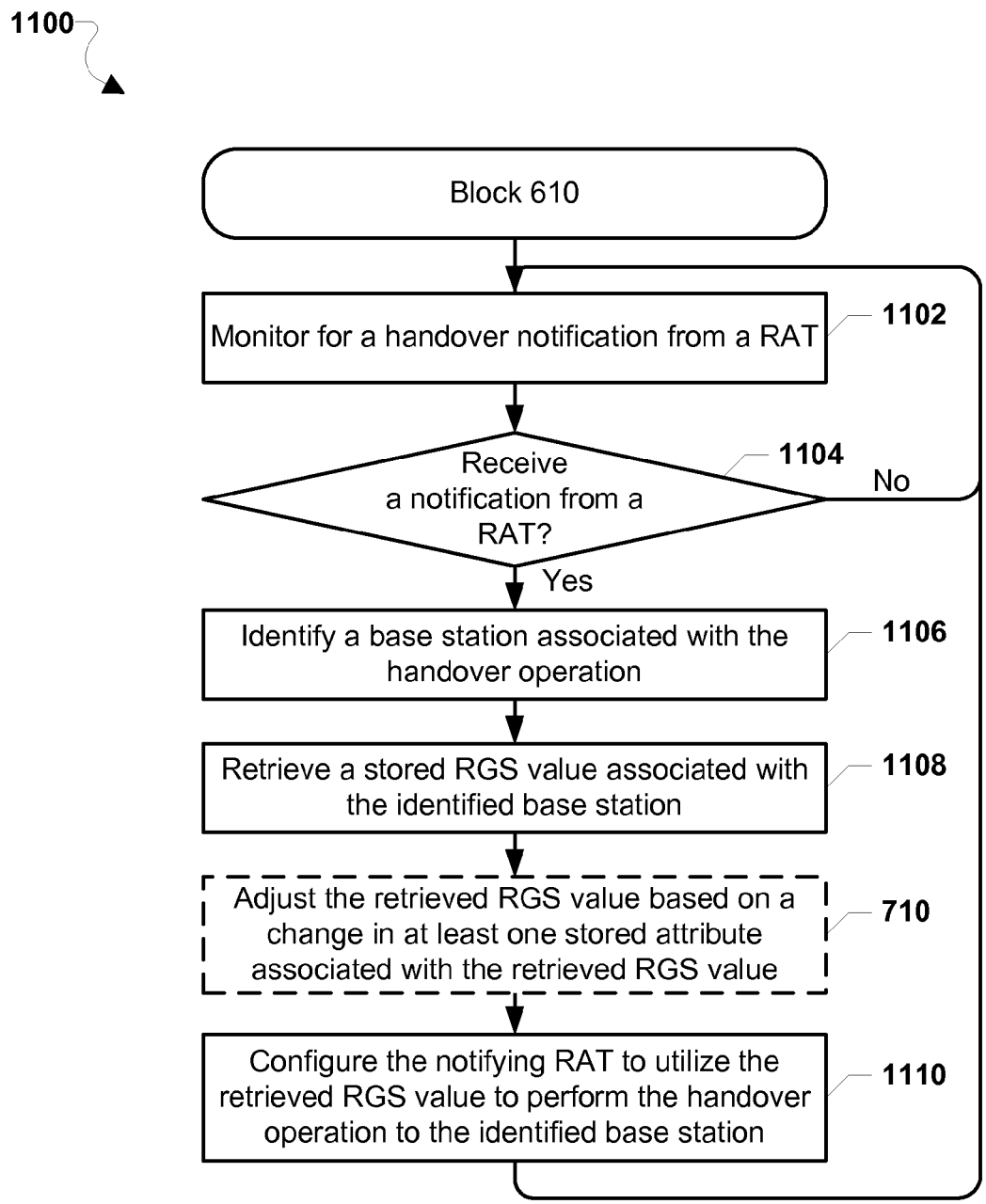
FIG. 11 is a process flow diagram illustrating a method for configuring a RAT to perform a handover operation based on an RGS value associated with a base station to which the RAT is switching according to various embodiments.

FIG. 11 illustrates a method 1100 for configuring a RAT to perform a handover operation to an identified base station by utilizing an RGS value associated with the identified base station according to some embodiments. The method 1100 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). With reference to FIGS. 1, 2, and 4-11, the operations of the method 1100 may implement embodiments of the operations of the method 600 (see FIG. 6). Thus, the device processor may begin performing the operations of the method 1100 in response to storing RGS values and their associations in block 610 of the method 600.

In block 1102, the device processor may monitor for a handover notification from a RAT. In some embodiments, the device processor may monitor for signals indicating that a RAT is or is about to perform a handover operation from a first base station to a second base station (e.g., from the first base station 130 to the second base station 140 of FIG. 1). In some embodiments, the device processor may additionally or alternatively monitor signals or conditions that may indicate a likelihood of a RAT's performing a handover operation, such as a low-reception signal strength or a poor quality of service from the first base station.

In determination block 1104, the device processor may determine whether a notification from a RAT has been received, and may continue monitoring for a handover notification from a RAT in block 1102 so long as a handover notification is not received from a RAT (i.e., determination block 1104="No").

In response to determining that a handover notification has been received from a RAT (i.e., determination block 1104="Yes"), the device processor may identify a base station associated with the handover operation in block 1106. In some embodiments, the device processor may identify the base station directly from the handover notification, such as may occur in the event that the RAT directly identifies the base station to which it is or is about to acquire service. In some embodiments, the device processor may identify the base station based on the results of inter-RAT measurements indicating that a certain base station using a particular RAT is capable of providing better service.

In block 1108, the device processor may retrieve a stored RGS value associated with the base station identified in block 1106, such as by performing a look up in a data table of associations stored in memory (e.g., the data tables 500, 510 described with reference to FIGS. 5A-5B) to identify the RGS value that is associated with the identified base station and retrieving that RGS value associated with the base station from memory (e.g., the memory 214).

In optional block 710, the device processor may adjust the retrieved RGS value based on a change in at least one stored attribute associated with the retrieved RGS value, such as by performing operations similar to those described above with reference to optional block 710 of the method 700 (see, e.g., FIG. 7). In other words, the device processor may adjust the RGS value retrieved in block 1108 to compensate for any changes in conditions/circumstances of the mobile communication device that may have occurred since the RGS value was initially obtained and stored. For example, the device processor may adjust the retrieved RGS value based on a change in the crystal oscillator's temperature.

In block 1110, the device processor may configure the notifying RAT to utilize the RGS value retrieved in block 1108 (and optionally adjusted in optional block 710) to perform the handover operation to the identified base station. In some embodiments, the device processor may utilize the obtained RGS value to determine the frequencies needed for the notifying RAT to communicate with and receive service from the identified base station.

The device processor may repeat the above operations of the method 1100 in a loop by again monitoring for a sleep notification from a RAT in block 1102.

Figure 12:
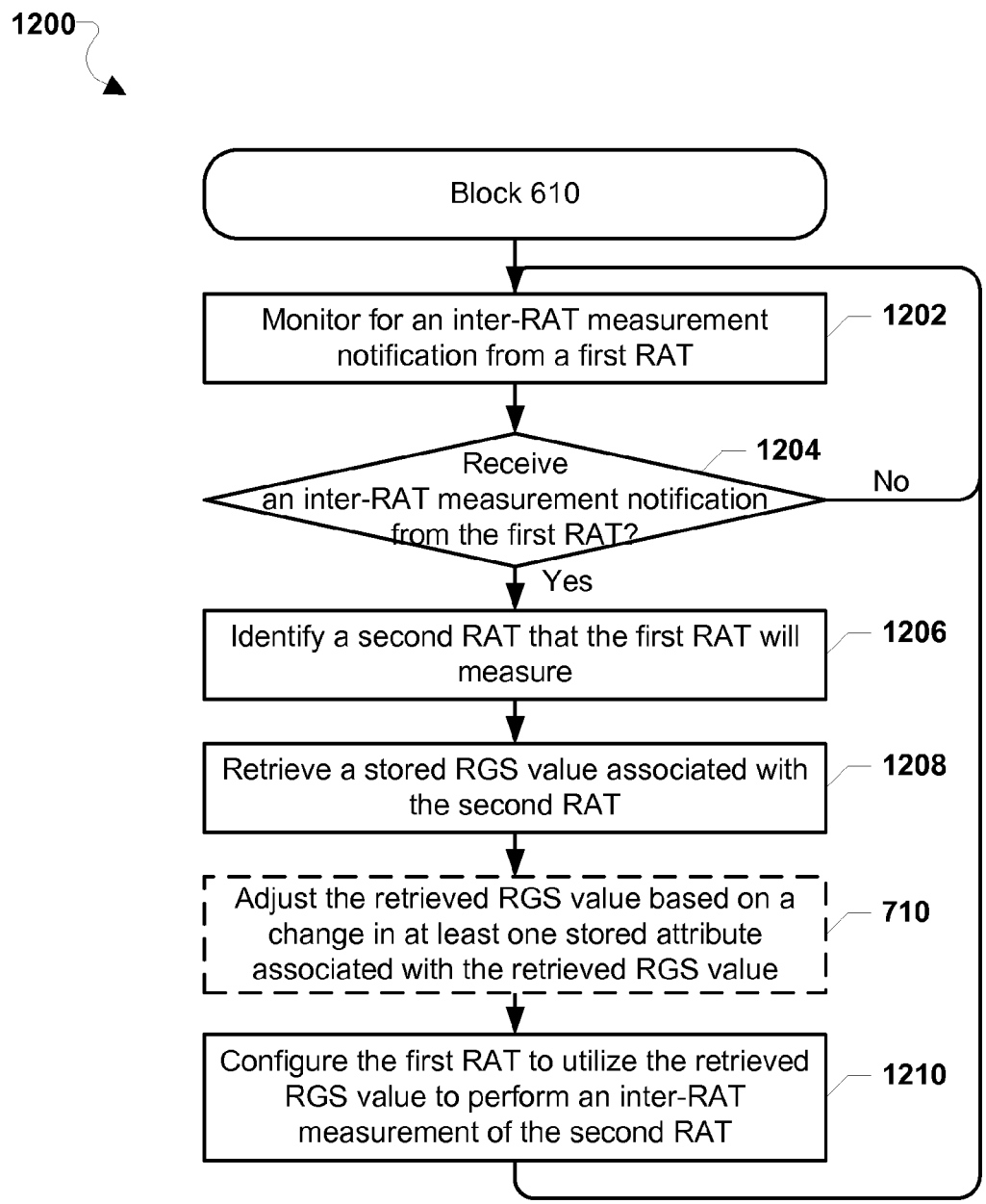
FIG. 12 is a process flow diagram illustrating a method for configuring a first RAT to perform an inter-RAT measurement of a second RAT based on an RGS value associated with the second RAT according to various embodiments.

FIG. 12 illustrates a method 1200 for configuring a first RAT to perform inter-RAT measurements of a second RAT by utilizing an RGS value associated with the second RAT according to some embodiments. The method 1200 may be implemented with a processor (e.g., the general purpose processor 206 of FIG. 2, the baseband modem processor 216, the crystal oscillator manager 230, a separate controller, and/or the like) of a mobile communication device (e.g., the mobile communication device 200 of FIG. 2). With reference to FIGS. 1, 2, and 4-12, the operations of the method 1200 may implement embodiments of the operations of the method 600 (see FIG. 6). Thus, the device processor may begin performing the operations of the method 1200 in response to storing RGS values and their associations in block 610 of the method 600.

In block 1202, the device processor may monitor for an inter-RAT measurement notification from a first RAT, such as by monitoring for indications or direct notifications from a RAT that the first RAT is or is about to perform inter-RAT measurements.

In determination block 1204, the device processor may determine whether an inter-RAT measurement notification from the first RAT has been received, and may continue monitoring for an inter-RAT measurement notification from the first RAT in block 1202 so long as an inter-RAT measurement notification is not received from the first RAT (i.e., determination block 1204="No").

In response to determining that an inter-RAT measurement notification has been received from the first RAT (i.e., determination block 1204="Yes"), the device processor may identify a second RAT that the first RAT will measure as part of the inter-RAT measurement in block 1206. In some embodiments, the device processor may identify the second RAT directly from the inter-RAT measurement notification.

In block 1208, the device processor may retrieve a stored RGS value associated with the second RAT identified in block 1206, such as by performing a look up in a data table of associations stored in memory (e.g., the data tables 500, 510 described with reference to FIGS. 5A-5B) to identify the RGS value that is associated with the second RAT and retrieving that RGS value associated with the base station from memory (e.g., the memory 214).

In optional block 710, the device processor may adjust the RGS value retrieved in block 1208 based on a change in at least one stored attribute associated with the retrieved RGS value, such as by performing operations similar to those described above with reference to optional block 710 of the method 700 (see, e.g., FIG. 7). In other words, the device processor may adjust the RGS value retrieved in block 1208 to compensate for any changes in conditions/circumstances of the mobile communication device that may have occurred since the RGS value was initially obtained and stored. For example, the device processor may adjust the retrieved RGS value based on a change in the crystal oscillator's temperature.

In block 1210, the device processor may configure the first RAT to utilize the RGS value retrieved in block 1208 (and optionally adjusted in optional block 710) to perform an inter-RAT measurement of the second RAT.

The device processor may repeat the above operations of the method 1200 in a loop by again monitoring for a sleep notification from a RAT in block 1202.

Figure 13:
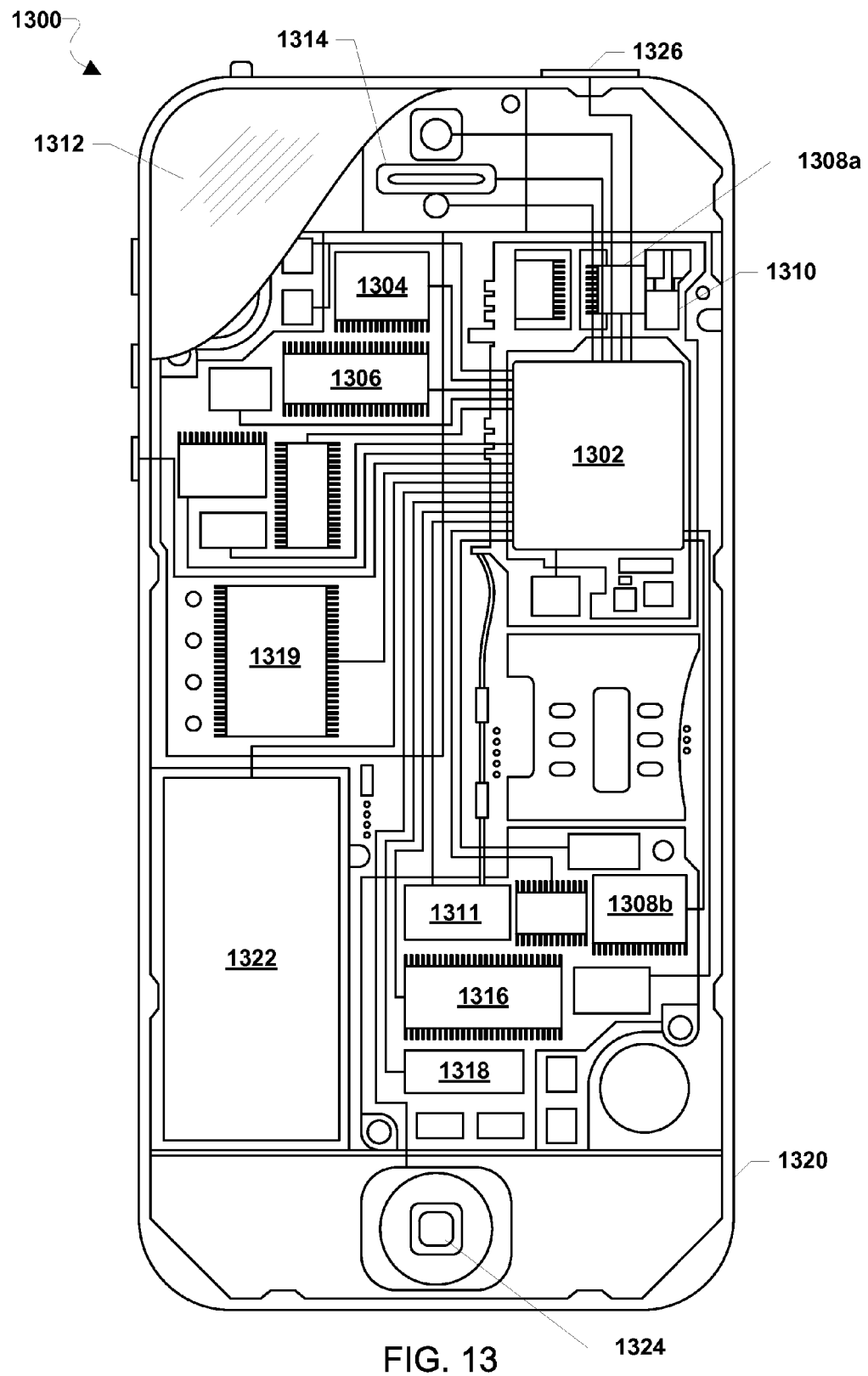
FIG. 13 is a component block diagram of a mobile communication device suitable for implementing some embodiment methods.

Various embodiments may be implemented in any of a variety of mobile communication devices, an example of which (e.g., a mobile communication device 1300) is illustrated in FIG. 13. According to various embodiments, the mobile communication device 1300 may be similar to the mobile communication devices 110, 120, 200 as described above with reference to FIGS. 1-2. As such, the mobile communication device 1300 may implement the methods 600, 700, 720, 740, 800, 820, 900, 1000, 1100, 1200 of FIGS. 6-12.

The mobile communication device 1300 may include a processor 1302 coupled to a touchscreen controller 1304 and an internal memory 1306. The processor 1302 may be one or more multi-core integrated circuits designated for general or specific processing tasks. The internal memory 1306 may be volatile or non-volatile memory, and may also be secure and/or encrypted memory, or unsecure and/or unencrypted memory, or any combination thereof. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the mobile communication device 1300 need not have touch screen capability.

The mobile communication device 1300 may have one or more radio signal transceivers 1308a, 1308b (e.g., Peanut, Bluetooth, Zigbee, Wi-Fi, RF radio) and one or more antennae 1310, 1311, for sending and receiving communications, coupled to each other and/or to the processor 1302. The transceivers 1308a, 1308b and antennae 1310, 1311 may be used with the above-mentioned circuitry to implement the various wireless transmission protocol stacks and interfaces. The mobile communication device 1300 may include one or more SIM cards (e.g., a SIM 1319) coupled to the transceivers 1308a, 1308b and/or the processor 1302 and configured as described above. The mobile communication device 1300 may include one or more cellular network wireless modem chip(s) 1316 coupled to the processor 1302 and antennae 1310, 1311 that enables communication via two or more cellular networks via two or more radio access technologies.

The mobile communication device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

The mobile communication device 1300 may also include speakers 1314 for providing audio outputs. The mobile communication device 1300 may also include a housing 1320, constructed of a plastic, metal, or a combination of materials, for containing all or some of the components discussed herein. The mobile communication device 1300 may include a power source 1322 coupled to the processor 1302, such as a disposable or rechargeable battery. The rechargeable battery may also be coupled to the peripheral device connection port to receive a charging current from a source external to the mobile communication device 1300. The mobile communication device 1300 may also include a physical button 1324 for receiving user inputs. The mobile communication device 1300 may also include a power button 1326 for turning the mobile communication device 1300 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented by a mobile communication device for improving performance of a plurality of radio access technologies (RATs) on the mobile communication device, comprising:
    obtaining frequency error values for each of the plurality of RATs;
    associating the obtained frequency error values with each of the plurality of RATs and with at least one attribute based on times at which the frequency error values for the plurality of RATs are obtained, wherein an attribute comprises one of a temperature of the mobile communication device or a temperature of a crystal oscillator on the mobile communication device; and
    storing the obtained frequency error values and the associations of the obtained frequency error values.

2. The method of claim 1, wherein an attribute further comprises one of a base station identification, a subscription identification, a geographic location of the mobile communication device, a service network identification, and a timestamp.

3. The method of claim 1, further comprising:
    identifying a RAT in the plurality of RATs associated with a request for a frequency error value from a requesting entity;
    retrieving a stored frequency error value associated with the identified RAT; and
    sending the retrieved frequency error value to the requesting entity.

4. The method of claim 3, wherein retrieving the stored frequency error value associated with the identified RAT comprises:
    identifying a first group of frequency error values associated with the identified RAT;
    determining a confidence value for each frequency error value in the first group of frequency error values; and
    retrieving a stored frequency error value in the first group of frequency error values that has a highest confidence value in the first group of frequency error values.

5. The method of claim 3, further comprising adjusting the retrieved frequency error value based on a change in at least one stored attribute associated with the retrieved frequency error value, wherein sending the retrieved frequency error value to the requesting entity comprises sending the adjusted frequency error value to the requesting entity.

6. The method of claim 5, wherein adjusting the retrieved frequency error value based on the change in at least one stored attribute associated with the retrieved frequency error value comprises adjusting the retrieved frequency error value based on a temperature change associated with the retrieved frequency error value.

7. The method of claim 3, wherein retrieving the stored frequency error value associated with the identified RAT comprises:
    identifying a first group of frequency error values associated with the identified RAT;
    determining whether there is at least one stored frequency error value in the first group of frequency error values; and
    retrieving a substitute stored frequency error value that is not associated with the identified RAT in response to determining that there are no frequency error values in the first group of frequency error values.

8. The method of claim 7, further comprising:
    determining whether at least one frequency error value in the first group of frequency error values has a confidence value that satisfies a confidence threshold in response to determining that there is at least one frequency error value in the first group of frequency error values;
    retrieving the substitute stored frequency error value that is not associated with the identified RAT in response to determining that no frequency error value in the first group of frequency error values associated with the identified RAT has a confidence value that satisfies the confidence threshold; and
    retrieving a stored frequency error value in the first group of frequency error values that has a highest confidence value in the first group of frequency error values in response to determining that a frequency error value in the first group of frequency error values associated with the identified RAT has a confidence value that satisfies the confidence threshold.

9. The method of claim 7, wherein retrieving the substitute stored frequency error value that is not associated with the identified RAT comprises:
    identifying a subscription associated with the identified RAT;
    identifying a second group of frequency error values associated with the identified subscription; and
    determining a confidence value for each stored frequency error value in the second group of frequency error values.

10. The method of claim 9, further comprising:

determining whether there is a stored frequency error value in the second group of frequency error values that satisfies a confidence threshold; and retrieving a stored frequency error value in the second group of frequency error values that has a highest confidence value within the second group of frequency error values in response to determining that there is a stored frequency error value in the second group of frequency error values that satisfies the confidence threshold.

11. The method of claim 10, further comprising:

determining whether there is a stored frequency error value available on the mobile communication device in response to determining that there is no stored frequency error value in the second group of frequency error values associated with the identified subscription that satisfies the confidence threshold;

retrieving a stored frequency error value available on the mobile communication device that has a highest confidence value in response to determining that there is a stored frequency error value available on the mobile communication device; and generating a frequency error value approximation using a mathematical model in response to determining that there is no stored frequency error value available on the mobile communication device.

12. The method of claim 1, further comprising:

determining an updated frequency error value for a RAT of the plurality of RATs based on current network conditions of the RAT;

associating the updated frequency error value with the RAT; and storing the updated frequency error value and the association of the updated frequency error value with the RAT.

13. The method of claim 12, further comprising associating the updated frequency error value with at least one current attribute based on a time at which the updated frequency error value is determined, wherein storing the updated frequency error value and the association of the updated frequency error value with the RAT comprises storing the updated frequency error value and the association of the updated frequency error value with the RAT and with the at least one current attribute.

14. The method of claim 1, further comprising:

determining an updated frequency error value for a RAT of the plurality of RATs based on current network conditions of the RAT;

retrieving a stored frequency error value associated with the RAT; and modifying the stored frequency error value associated with the RAT based on the updated frequency error value.

15. The method of claim 14, further comprising:

identifying at least one attribute associated with the updated frequency error value based on a time at which the updated frequency error value is determined; and modifying at least one attribute associated with the modified frequency error value based on at least one identified attribute associated with the updated frequency error value.

16. The method of claim 1, further comprising:

retrieving a frequency error value associated with a RAT in the plurality of RATs in response to receiving a sleep notification from the RAT;

determining a period of time based on the sleep notification and the retrieved frequency error value; and configuring the RAT to wake up at an expiration of the period of time.

17. The method of claim 16, further comprising adjusting the retrieved frequency error value based on a change in at least one stored attribute associated with the retrieved frequency error value, wherein determining the period of time based on the sleep notification and the retrieved frequency error value comprises determining the period of time based on the sleep notification and the adjusted frequency error value.

18. The method of claim 1, further comprising:

determining that a RAT in the plurality of RATs is about to perform one of network acquisition operations and network re-acquisition operations;

retrieving a frequency error value associated with the RAT; and configuring the RAT to perform the one of the network acquisition operations and the network re-acquisition operations based on the retrieved frequency error value.

19. The method of claim 18, further comprising adjusting the retrieved frequency error value based on a change in at least one stored attribute associated with the retrieved frequency error value, wherein configuring the RAT to perform the one of the network acquisition operations and the network re-acquisition operations based on the retrieved frequency error value comprises configuring the RAT to perform the one of the network acquisition operations and the network re-acquisition operations based on the adjusted frequency error value.

20. The method of claim 1, further comprising:

retrieving a frequency error value associated with a base station in response to determining that a RAT in the plurality of RATs is about to perform a handover operation to the base station; and configuring the RAT to perform the handover operation to the base station based on the retrieved frequency error value.

21. The method of claim 20, further comprising adjusting the retrieved frequency error value based on a change in at least one stored attribute associated with the retrieved frequency error value, wherein configuring the RAT to perform the handover operation to the base station based on the retrieved frequency error value comprises configuring the RAT to perform the handover operation to the base station based on the adjusted frequency error value.

22. The method of claim 1, further comprising:

retrieving a frequency error value associated with a second RAT in the plurality of RATs in response to determining that a first RAT in the plurality of RATs is about to perform an inter-RAT measurement of the second RAT; and configuring the first RAT to perform the inter-RAT measurement of the second RAT based on the retrieved frequency error value.

23. The method of claim 22, further comprising adjusting the retrieved frequency error value based on a change in at least one stored attribute associated with the retrieved frequency error value, wherein configuring the first RAT to perform the inter-RAT measurement of the second RAT based on the retrieved frequency error value comprises configuring the first RAT to perform the inter-RAT measurement of the second RAT based on the adjusted frequency error value.

24. A mobile communication device, comprising:
a memory;
a radio-frequency (RF) resource; and
a processor coupled to the memory, the RF resource and at least one Subscriber Identity Module (SIM), wherein the processor is configured to:
  obtain frequency error values for each of a plurality of radio access technologies (RATs);
  associating the obtained frequency error values with each of the plurality of RATs and with at least one attribute based on times at which the frequency error values for the plurality of RATs are obtained, wherein an attribute comprises one of a temperature of the mobile communication device or a temperature of a crystal oscillator on the mobile communication device; and
  storing the obtained frequency error values and the associations of the obtained frequency error values in the memory.

25. The mobile communication device of claim 24, wherein an attribute further comprises one of a base station identification, a subscription identification, a geographic location of the mobile communication device, a service network identification, and a timestamp.

26. The mobile communication device of claim 24, wherein the processor is further configured to:
  identify a RAT of the plurality of RATs associated with a request for a frequency error value from a requesting entity;
  retrieve a stored frequency error value associated with the identified RAT from the memory; and
  send the retrieved frequency error value to the requesting entity.

27. The mobile communication device of claim 26, wherein the processor is further configured to:
  adjust the retrieved frequency error value based on a change in at least one stored attribute associated with the retrieved frequency error value; and
  send the adjusted frequency error value to the requesting entity.

28. The mobile communication device of claim 24, wherein the processor is further configured to:
  determine an updated frequency error value for a RAT of the plurality of RATs based on current network conditions of the RAT;
  associate the updated frequency error value with the RAT; and
  store the updated frequency error value and the association of the updated frequency error value with the RAT in the memory.

29. A non-transitory processor-readable storage medium having stored thereon processor-executable instructions configured to cause a processor of a mobile communication device to perform operations for improving performance of a plurality of radio access technologies (RATs) on the mobile communication device, the operations comprising:
  obtaining frequency error values for each of the plurality of RATs;
  associating the obtained frequency error values with each of the plurality of RATs and with at least one attribute based on times at which the frequency error values for the plurality of RATs are obtained, wherein an attribute comprises one of a temperature of the mobile communication device or a temperature of a crystal oscillator on the mobile communication device; and
  storing the obtained frequency error values and the associations of the obtained frequency error values.

30. A mobile communication device, comprising:
means for obtaining frequency error values for each of a plurality of radio access technologies (RATs);
associating the obtained frequency error values with each of the plurality of RATs and with at least one attribute based on times at which the frequency error values for the plurality of RATs are obtained, wherein an attribute comprises one of a temperature of the mobile communication device or a temperature of a crystal oscillator on the mobile communication device; and
storing the obtained frequency error values and the associations of the obtained frequency error values.

* * * * *